US012790737B2

(12) United States Patent
Berndsen et al.

(10) Patent No.: US 12,790,737 B2
(45) Date of Patent: Nov. 10, 2026

(54) PARTICLES PRESS RESERVOIR

(71) Applicant: WHIRLPOOL CORPORATION, Benton Harbor, MI (US)

(72) Inventors: Rodrigo Strzelecki Berndsen, Fabriano (IT); Tibor Budicky, Mlynica (SK); Brent M. Burgess, Edwardsburg, MI (US); Jalindar S. Dawange, Maharashtra (IN); Sean P. Fitzgerald, Sodus, MI (US); Richard L. Hammond, Mattawan, MI (US); Omar R. Murad, Rio Claro (BR); Bruno T. Ramasco, Stevensville, MI (US); Ryan J. Van Zoest, Benton Harbor, MI (US); Wei Zheng, Benton Harbor, MI (US); Rachael K. Acker, East Lansing, MI (US); Eric J. Vasko, Ann Arbor, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 445 days.

(21) Appl. No.: 18/239,889

(22) Filed: Aug. 30, 2023

(65) Prior Publication Data

US 2025/0073623 A1 Mar. 6, 2025

(51) Int. Cl.
*D06F 39/10* (2006.01)
*B01D 29/76* (2006.01)
(Continued)

(52) U.S. Cl.
CPC ............ *D06F 39/10* (2013.01); *B01D 29/76* (2013.01); *D06F 2103/42* (2020.02); *D06F 2105/34* (2020.02)

(58) Field of Classification Search
CPC .. D06F 39/10; D06F 2103/42; D06F 2105/34; B01D 29/76
See application file for complete search history.

(56) References Cited

U.S. PATENT DOCUMENTS 3,959,140 A 5/1976 Legras
9,220,392 B2 12/2015 Morrison et al.
(Continued)

FOREIGN PATENT DOCUMENTS

CN 115591291 A 1/2023
DE 102022207949 A1 2/2023
(Continued)

*Primary Examiner* — Joseph L. Perrin
(74) *Attorney, Agent, or Firm* — Price Heneveld LLP

(57) ABSTRACT

A laundry appliance is provided and includes a cabinet, a tub disposed within the cabinet, and a drum disposed within the tub. The drum is rotatable within the tub and a fluid flow system disposed within the cabinet. The fluid flow system includes a separator configured to separate microplastics from fluid within the fluid flow system. The laundry appliance also includes a particulate reservoir disposed within the cabinet and operable between a static condition and a compressed condition. The particulate reservoir including a capsule disposed within the cabinet and configured to receive microplastics, a cap coupled to the capsule, and a nozzle extending outward from the capsule. The nozzle is configured to permit flow of the microplastics into the capsule in the static condition.

20 Claims, 20 Drawing Sheets

(51) Int. Cl.

| | |
|---|---|
| *D06F 103/42* | (2020.01) |
| *D06F 105/34* | (2020.01) |

(56) References Cited

U.S. PATENT DOCUMENTS

| | | | | |
|---|---|---|---|---|
| 9,409,106 | B2 | 8/2016 | Levitt | |
| 11,066,771 | B2 | 7/2021 | Zercone et al. | |
| 2009/0071912 | A1 | 3/2009 | Mishina et al. | |
| 2020/0316501 | A1 | 10/2020 | Jones | |
| 2022/0106728 | A1 | 4/2022 | Welch et al. | |
| 2022/0339562 | A1 | 10/2022 | Vestman et al. | |
| 2023/0030772 | A1 | 2/2023 | Root et al. | |
| 2024/0209560 | A1* | 6/2024 | Palanisamy | B01D 33/11 |
| 2025/0090982 | A1* | 3/2025 | Flisek | B01D 29/62 |
| 2025/0214865 | A1* | 7/2025 | Blomqvist | C02F 9/00 |

FOREIGN PATENT DOCUMENTS

| | | | |
|---|---|---|---|
| EP | 3721976 | A1 | 10/2020 |
| EP | 3392398 | B1 | 11/2020 |
| EP | 3915662 | A1 | 12/2021 |
| EP | 3988698 | A1 | 4/2022 |
| WO | 2021070103 | A1 | 4/2021 |
| WO | 2022084677 | A1 | 4/2022 |
| WO | 2022229646 | A1 | 11/2022 |
| WO | 2022263250 | A2 | 12/2022 |

* cited by examiner

PARTICLES PRESS RESERVOIR

BACKGROUND OF THE DISCLOSURE

The present disclosure generally relates to a particle reservoir, in particular, a particle reservoir for an appliance.

SUMMARY OF THE DISCLOSURE

According to one aspect of the present disclosure, an appliance includes a cabinet, a tub disposed within the cabinet, and a fluid flow system disposed within the cabinet. The laundry appliance also includes a particulate reservoir disposed within the cabinet and operable between a static condition and a compressed condition. The particulate reservoir includes a capsule disposed within the cabinet and configured to receive particulate-laden fluid, a cap coupled to the capsule, and a nozzle extending outward from the capsule. The nozzle is configured to permit flow of the particulate-laden fluid into the capsule in the static condition, and where particulates of the particulate-laden fluid are captured within the capsule.

According to another aspect of the present disclosure, an appliance includes a cabinet, a tub disposed within the cabinet, and a fluid flow system disposed within the cabinet. The fluid flow system includes a separator configured to separate microplastics from fluid within the fluid flow system and a particulate reservoir disposed within the cabinet. The particulate reservoir includes a reservoir housing, and a capsule disposed within the reservoir housing. The capsule defines a receiving cavity that is configured to receive microplastics from the separator. A cap is operably disposed over a front portion of the capsule. A plunger assembly is coupled to the cap and extends into the receiving cavity. The plunger assembly is configured to define a static condition of the particulate reservoir that receives the microplastics from the separator and a compressed condition that is configured to compress the microplastics within a rear portion of the receiving cavity into a puck of compressed microplastics.

According to yet another aspect of the present disclosure, an appliance includes a cabinet, a tub disposed within the cabinet, and a fluid flow system disposed within the cabinet. The fluid flow system includes a separator configured to separate microplastics from fluid within the fluid flow system, and a particulate reservoir disposed within the cabinet and operable between a static condition and a compressed condition. The particulate reservoir includes a pliable capsule at least partially disposed within the cabinet. The pliable capsule defining a pliable body and a neck extending off of the pliable body. The pliable body defines a pliable capsule reservoir that is configured to receive microplastics from the separator, a cap operably coupled to the neck, and a nozzle extending outward from the capsule. The nozzle is configured to permit flow of the microplastics into the pliable capsule reservoir in the static condition. The nozzle is configured to permit flow of the fluid out of the pliable capsule reservoir and into the separator in the compressed condition.

These and other features, advantages, and objects of the present disclosure will be further understood and appreciated by those skilled in the art by reference to the following specification, claims, and appended drawings.

Figure 1:
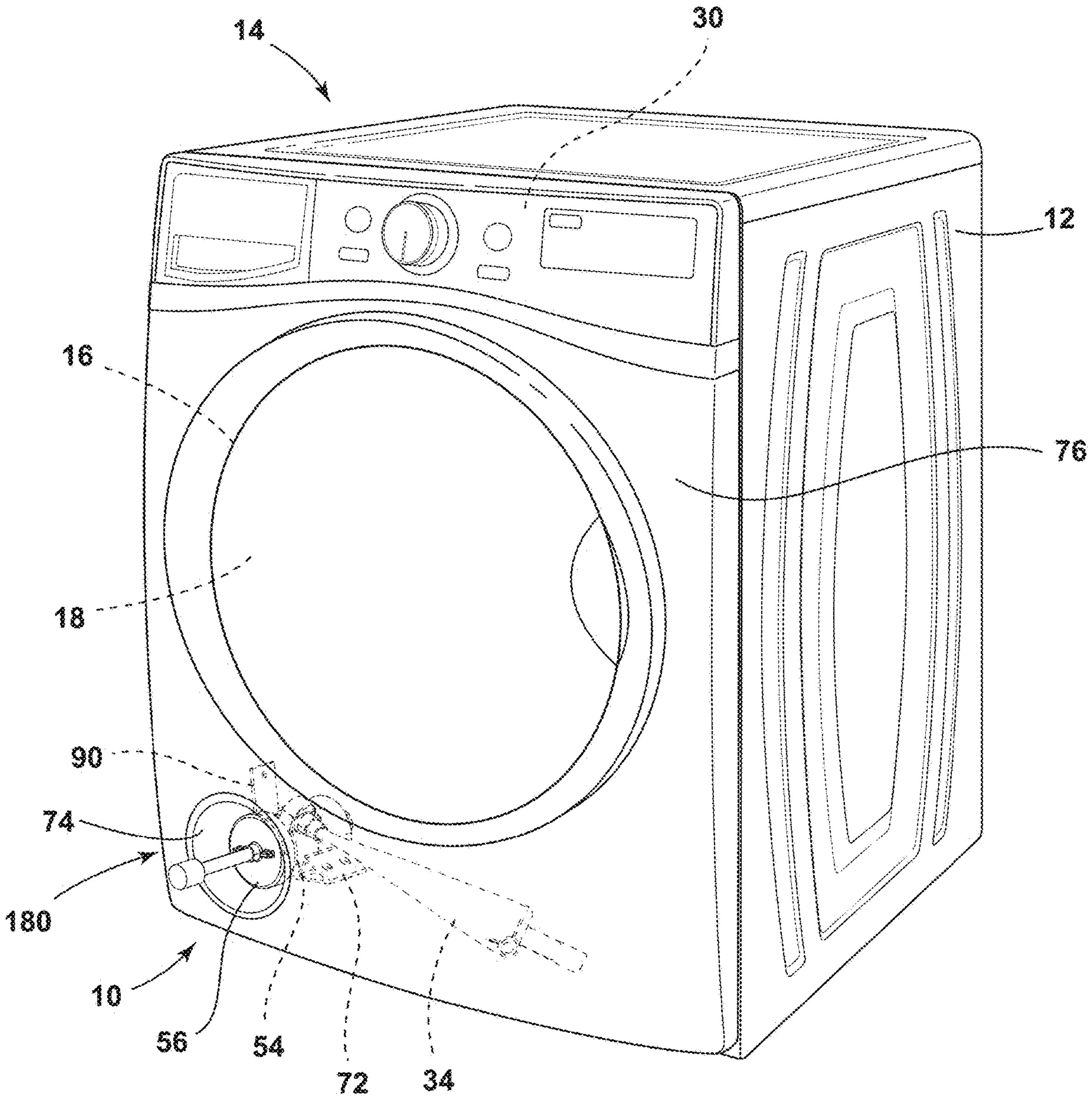
FIG. 1 is a front perspective view of an appliance with a particulate reservoir and a hydrocyclone separator, according to an aspect of the present disclosure.

The components in the figures are not necessarily to scale, emphasis instead being placed upon illustrating the principles described herein.

DETAILED DESCRIPTION

The present illustrated embodiments reside primarily in combinations of method steps and apparatus components related to a particulate reservoir. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

For purposes of description herein, the terms "upper," "lower," "right," "left," "rear," "front," "vertical," "horizontal," and derivatives thereof shall relate to the disclosure as oriented in FIG. 1. Unless stated otherwise, the term "front" shall refer to the surface of the element closer to an intended viewer, and the term "rear" shall refer to the surface of the element further from the intended viewer. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The terms "including," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises a . . . " does not, without more constraints, preclude the existence of additional identical elements in the process, method, article, or apparatus that comprises the element.

Referring to FIGS. 1-27, reference numeral 10 generally refers to a particle reservoir that is incorporated within a cabinet 12 of an appliance 14. The appliance 14 can be in the form of a cleaning appliance having a tub 16 within the cabinet 12. In the case of a laundry appliance, a drum 18 is rotatably disposed within the tub 16. The cleaning appliance 14 can include, but is not limited to, a laundry washing appliance, a combination laundry washing and drying appliance, dishwasher, and other similar cleaning appliances. The drum 18 defines an inner process space that is used for cleaning and sanitizing various articles within the appliance 14.

The appliance 14 includes a fluid flow system 30 within the cabinet 12 that permits the flow of fluid into and out of the processing space. The fluid can include, but is not limited to, a laundry detergent, water, a treating solution, and/or a combination thereof. As the fluid flows into and out of the processing space, the fluid may pick up particulates 32 to form a particulate-laden fluid. The particles of the particulate-laden fluid includes particulates 32, such as microplastics, within the fluid. In certain conditions, the fluid from a fluid source, such as from a municipal supply or from a well, may contain microplastics and other particulates 32. As the microplastics 32 are carried through the fluid, the appliance can include a separator 34, such as a hydrocyclone separator, that separates the microplastics 32 from the fluid. The hydrocyclone separator 34 includes a separator inlet 36 that permits the flow of the fluid and microplastics 32 into an inner chamber 38 of the hydrocyclone separator 34. The inner chamber 38 generally defines a conical shape, or a frusto-conical shape, that directs the incoming fluid and microplastics into a cyclical flow such that a centrifugal force is provided and the heavier microplastics 32 are separated from the fluid. As the microplastics 32 separate from the fluid, the fluid is maintained at a wider region of the hydrocyclone separator, and the microplastics 32 accumulate at a narrower region of the hydrocyclone separator 34. The fluid is then directed towards a separator outlet 40 that directs the fluid back into the fluid flow system 30 and the microplastics 32 are directed to a separator nozzle 42 that disposes the microplastics 32 into the particulate reservoir 10.

Figure 8:
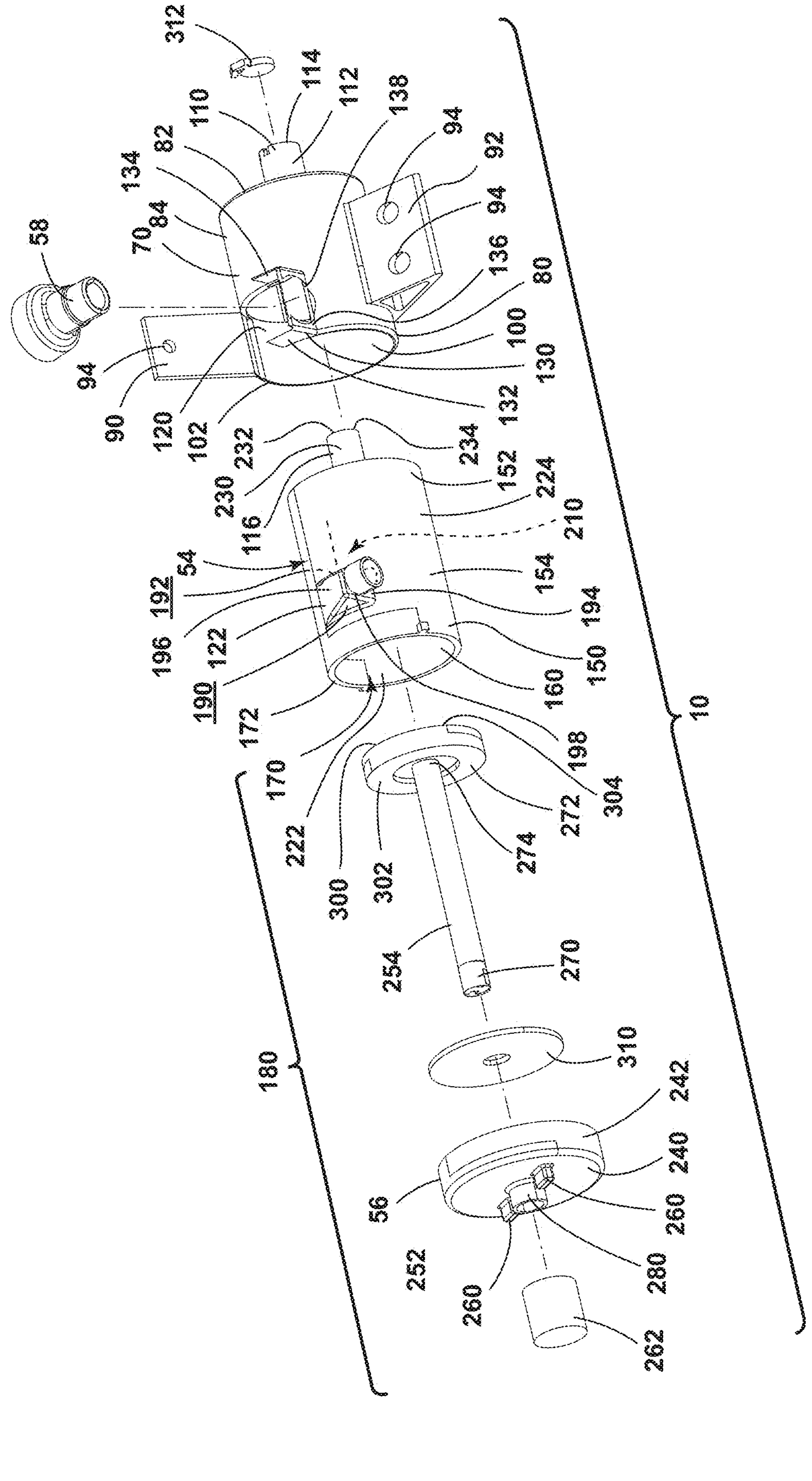
FIG. 8 is an exploded, side perspective view of a particulate reservoir with a plunger assembly, according to an aspect of the present disclosure.
Figure 9:
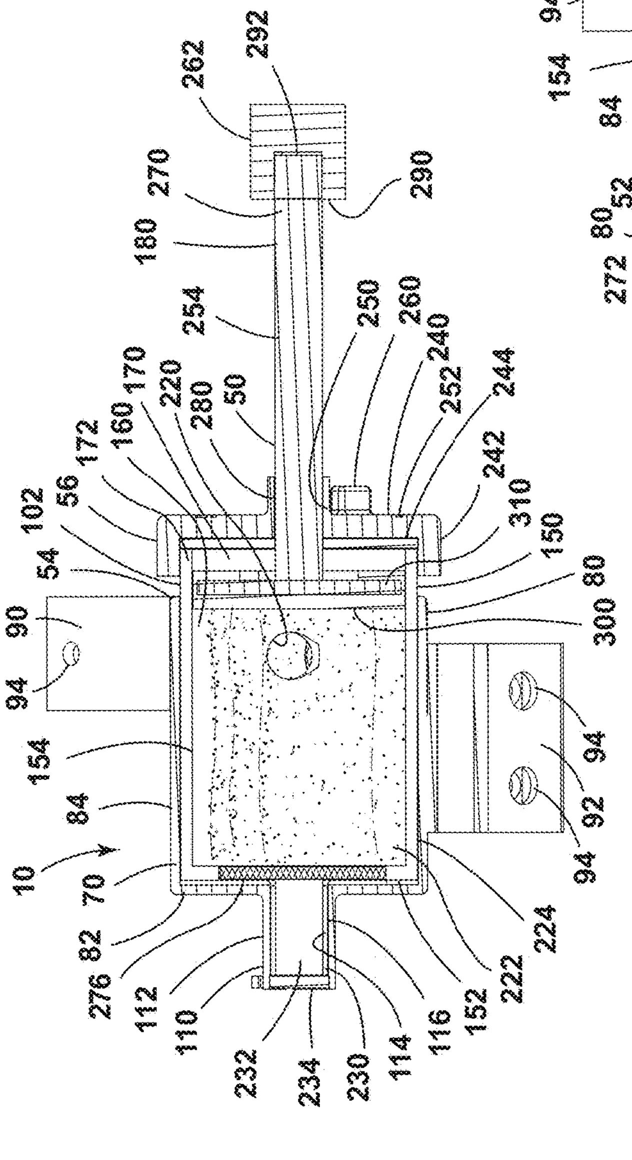
FIG. 9 is a cross-sectional view of a particulate reservoir with a plunger assembly in a decompressed static condition, according to an aspect of the present disclosure.
Figure 10:
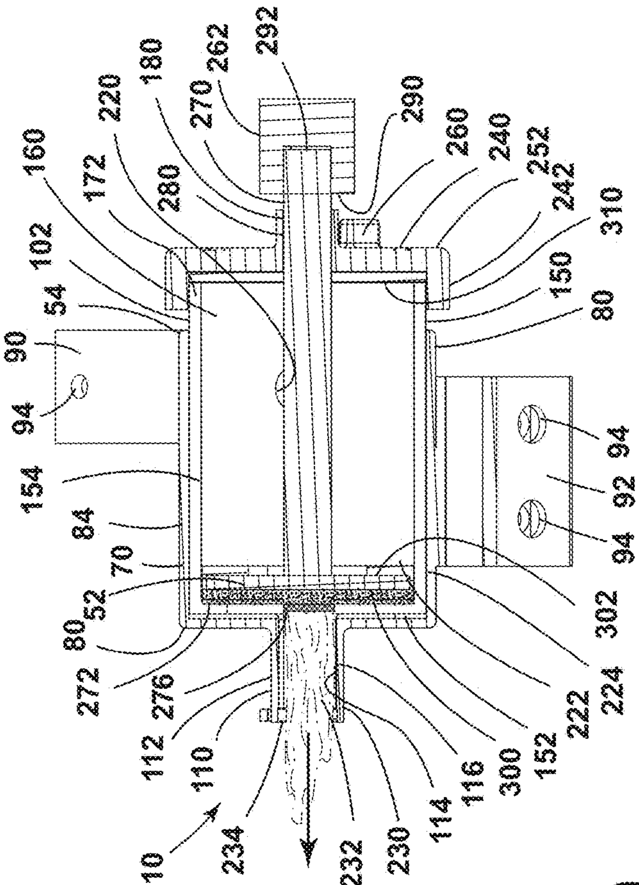
FIG. 10 is a schematic cross-sectional view of the particulate reservoir of FIG. 9 with the plunger assembly moving into a compressed condition, according to an aspect of the present disclosure.

Referring to FIGS. 1-10 the particulate reservoir 10 is disposed within the cabinet 12 and operable between a static condition 50 (shown in FIG. 9) and a compressed condition 52 (shown in FIG. 10). The particulate reservoir 10 includes a capsule 54 disposed within the cabinet 12 that is configured to receive the microplastics 32. A cap 56 is coupled to the capsule 54. A nozzle 58 extends outward from the capsule 54. The nozzle 58 is configured to permit flow of the microplastics 32 into the capsule 54 in the static condition 50.

Referring to FIGS. 2-10, the particle reservoir 10 may include a reservoir housing 70 disposed in the cabinet 12 of the appliance 14. In various aspects, the reservoir housing 70 is disposed within the cabinet 12 and is coupled to an exterior wall 72 of the tub 16 so that the particle reservoir 10 or a component thereof is accessible through the cabinet 12 or from the outside of the cabinet 12. In certain aspects, the reservoir housing 70 is disposed within a cabinet recess 74 and extends into the cabinet 12. For example, the cabinet 12 can define a cabinet recess 74 on a front panel 76 of the cabinet 12, where the cabinet recess 74 defines a cabinet recess aperture 78 that permits insertion of at least a portion of the reservoir housing 70 into the cabinet recess aperture 78 and subsequently through the front panel 76. According to various aspects, the reservoir housing 70 may define one of various sizes and shapes, such as a quadrilateral, cylindrical, oval, oblong, and/or rounded shape. In the illustrated embodiment, the reservoir housing 70 is shown with a cylindrical shape with a front section 80, a rear section 82 opposing the front section 80, and an outer wall 84 extending between the front section 80 and the rear section 82. According to various aspects, the reservoir housing 70 is configured to contain additional components of the particle reservoir 10, as provided herein. The reservoir housing 70 and the cabinet recess 74 can also be located in a side panel of the cabinet 12 or other readily accessible portion of the cabinet 12.

Figure 2:
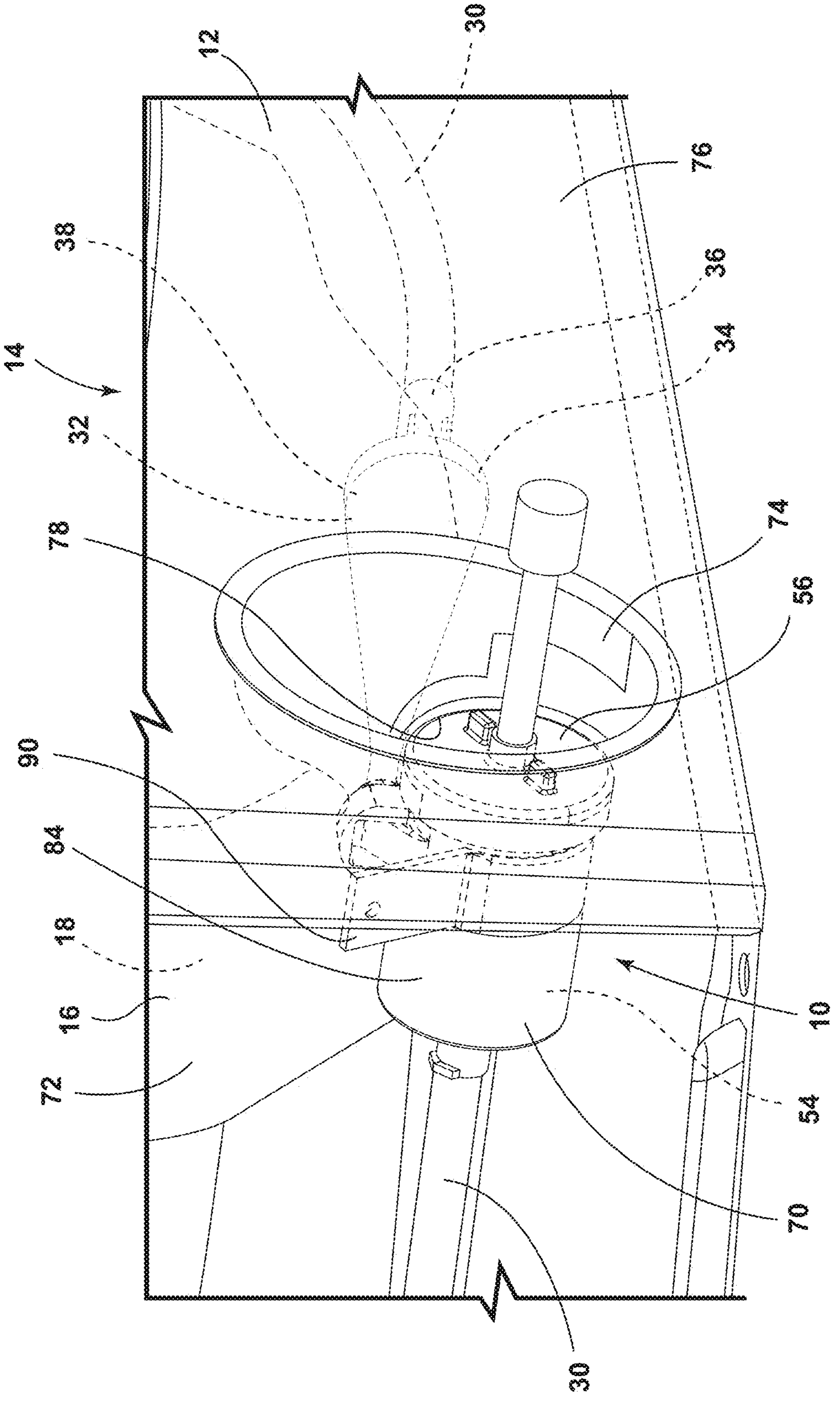
FIG. 2 is an enlarged, front perspective view of an appliance with a particulate reservoir and a hydrocyclone separator, according to an aspect of the present disclosure.
Figure 3:
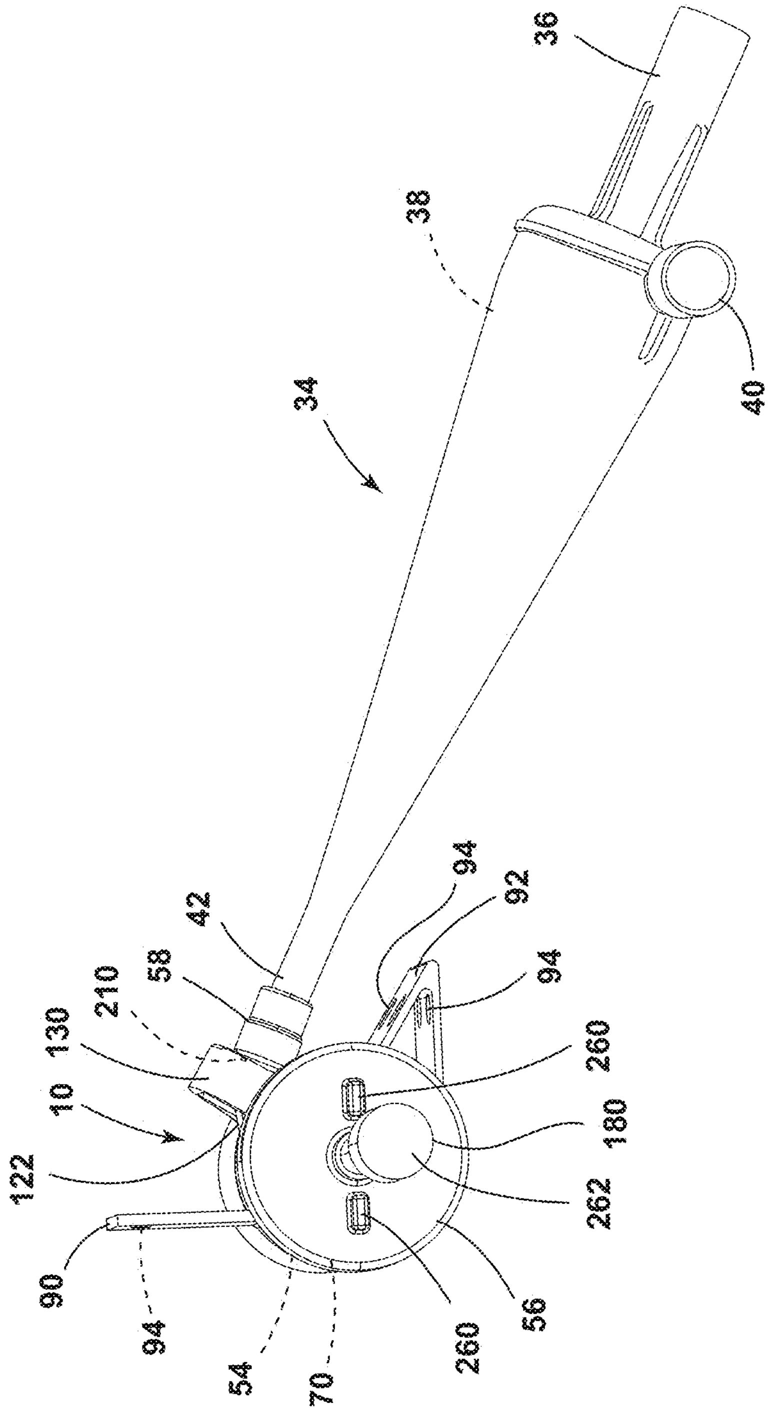
FIG. 3 is side perspective view of a particulate reservoir and a hydrocyclone separator, according to an aspect of the present disclosure.
Figure 4:
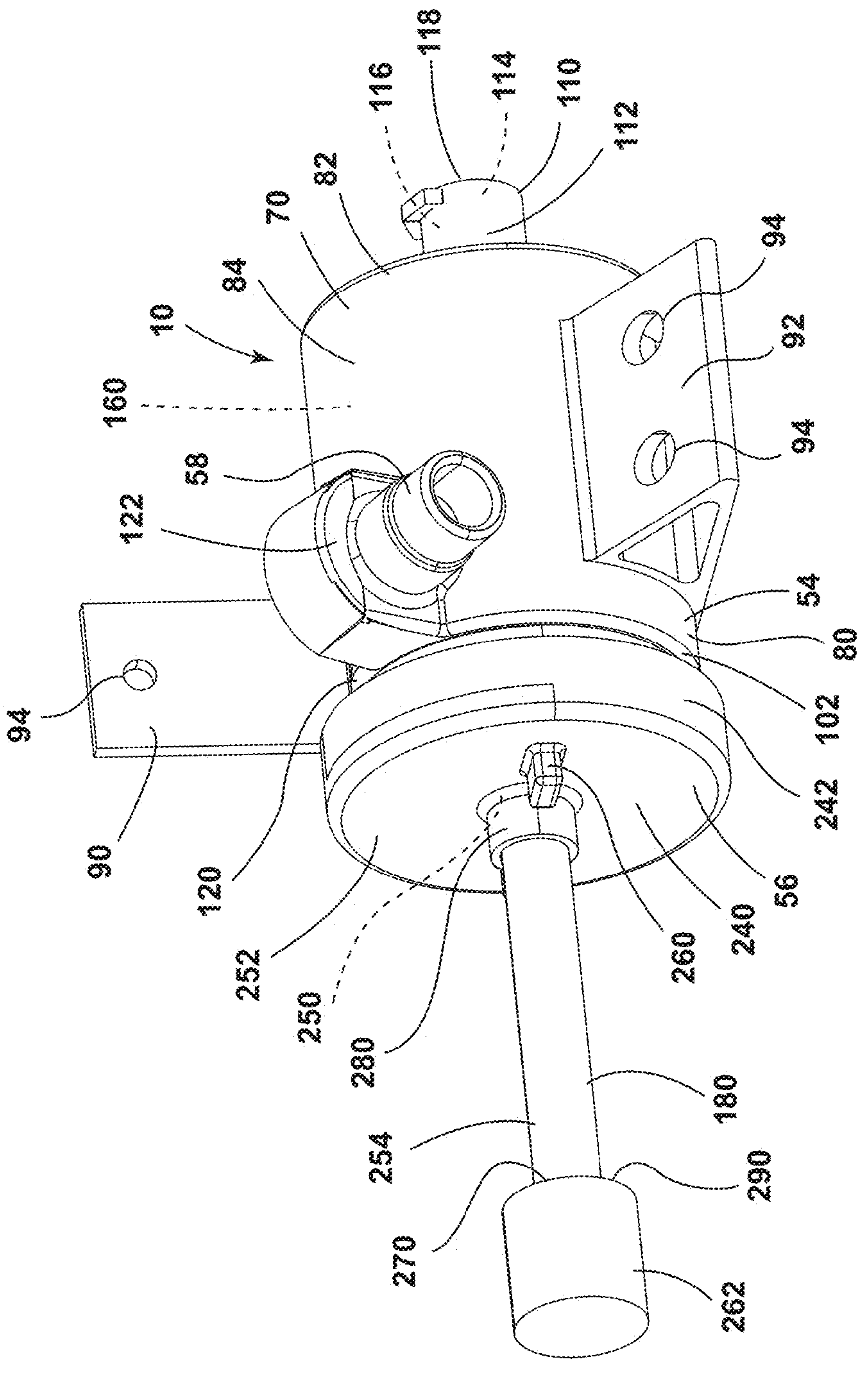
FIG. 4 is a side perspective view of a particulate reservoir with a plunger assembly, according to an aspect of the present disclosure.

Referring to FIGS. 2 and 3, the reservoir housing 70 can be coupled to an exterior wall 72 of the tub 16 via one or more brackets that are coupled or integrally formed with the reservoir housing 70. The reservoir housing 70 can include a first bracket 90 extending appliance-upward from the outer wall 84 of the reservoir housing 70 and a second bracket 92 extending outward from the outer wall 84 and offset from the first bracket 90. In various aspects, the first bracket 90 can define one of various shapes and sizes, such as a quadrilateral shape, a rounded shape, or one of other various shapes. The second bracket 92 can likewise define one of various shapes and sizes, such as a triangular shape, a quadrilateral shape, a rounded shape, or one of other various shapes. Additionally, or alternatively, the shape and/or size of the first bracket 90 or the second bracket 92 can be at least partially determined by various other aspects of the appliance 14, such as placement and/or size of the tub 16, or placement and/or size of the particle reservoir 10 within the cabinet 12. It is further generally contemplated that the placement of the first bracket 90 relative to the second bracket 92 may be at least partially determined by other aspects of the appliance 14. For example, the offset relationship between second bracket 92 and the first bracket 90 along the outer wall 84 of the reservoir housing 70 may be at least partially determined by the size and/or shape of the exterior wall 72 of the tub 16. In such examples, the curvature of the exterior wall 72 may coincide with the offset relationship between the second bracket 92 and the first bracket 90 such that both brackets 90, 92 abut the exterior wall 72 of the tub 16. In certain aspects of the device, it is also contemplated that the particle reservoir 10 can attach to a separate internal structure of the cabinet 12 using the first bracket 90 and the second bracket 92.

According to various aspects, the first bracket 90 and the second bracket 92 can define one or more bracket apertures 94 that receive one or more bracket fasteners that extend through the bracket apertures 94 and couple to the exterior wall 72 of the tub 16. For example, the first bracket 90 can define one bracket aperture 94 and the second bracket 92 can define a pair of bracket apertures 94, where the bracket apertures 94 on each bracket 90, 92 receive bracket fasteners that couple the reservoir housing 70 to the exterior wall 72 of the tub 16. Additionally, or alternatively, it is generally contemplated that the reservoir housing 70 can include a varying number of bracket apertures 94 of varying sizes and shapes without departing from the teachings herein.

Figure 7:
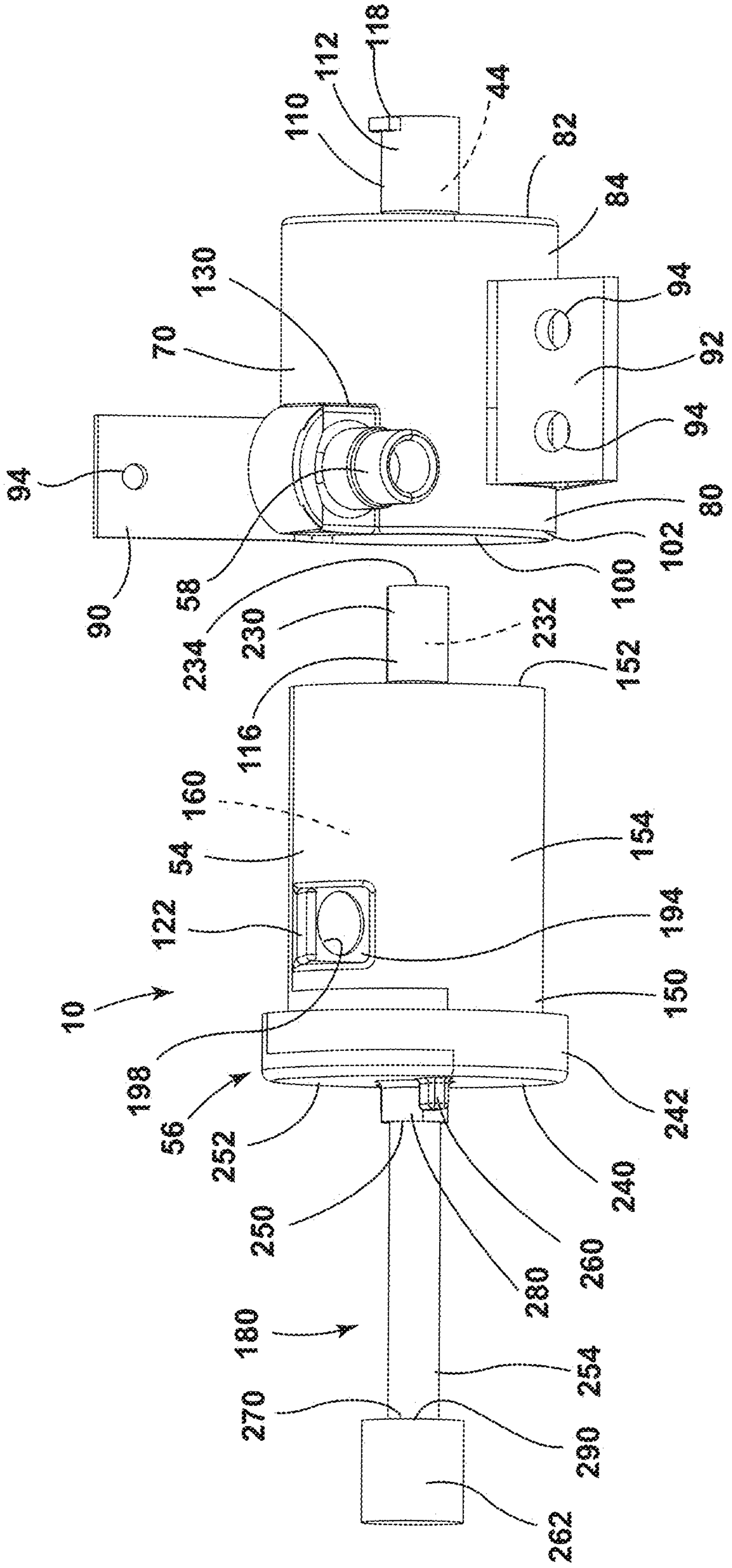
FIG. 7 is a partially exploded, side elevational view of a particulate reservoir with a plunger assembly, according to an aspect of the present disclosure.

Referring to FIGS. 7 and 8, the reservoir housing 70 defines a reservoir housing opening 100 at the front section 80 of the reservoir housing 70. In various aspects, the reservoir housing opening 100 may be defined on the front section 80 such that a reservoir housing rim 102 is defined around the reservoir housing opening 100. In other aspects, the reservoir housing opening 100 has a width and shape that coincides with a shape and/or size of the capsule 54 such that the capsule 54 can be inserted into the reservoir housing 70 via the reservoir housing opening 100.

Referring to FIGS. 4-10, the reservoir housing 70 includes a reservoir housing outlet 110 at the rear section 82. The reservoir housing outlet 110 includes an outlet body 112 that extends outward from the rear section 82 and an outlet channel 114 that extends through the outlet body 112. The outlet body 112 can define one of various shapes, such as a cylindrical shape. The outlet channel 114 extends from the rear section 82 of the reservoir housing 70 to an end 118 of the outlet body 112. The outlet channel 114 is configured to permit insertion of a capsule outlet 116 into the outlet channel 114, as provided herein.

Referring again to FIG. 8, the reservoir housing 70 includes a slotted region 120 defined on the outer wall 84. As illustrated in FIG. 8, the slotted region 120 extends from the front section 80 and towards the rear section 82 of the reservoir housing 70. According to various aspects, the shape, size, and/or length of extension of the slotted region 120 towards the rear section 82 is at least partially determined by the shape and/or size of the nozzle 58. In such aspects, the slotted region 120 permits insertion of the capsule 54 into the reservoir housing 70 until a nozzle base 122 abuts the outer wall 84 of the reservoir housing 70 at the slotted region 120.

Referring now to FIGS. 4-8, the reservoir housing 70 includes a nozzle support housing 130. The nozzle support housing 130 includes a front panel 132 that protrudes outward from the outer wall 84 and is proximate the front section 80 of the reservoir housing 70. A rear panel 134 opposes the front panel 132 and has a shape and size that generally coincides with the front panel 132. A lower panel 136 extends between the front panel 132 and the rear panel 134. The lower panel 136 defines a nozzle aperture 138 that permits extension of the nozzle 58 through the nozzle aperture 138. According to various aspects, the length of extension of the lower panel 136 between the front panel 132 and the rear panel 134, as well as the size and shape of the nozzle aperture 138, may be at least partially determined by the shape and size of the nozzle 58, as provided herein.

Referring now to FIGS. 4-10, the capsule 54 is inserted into the reservoir housing 70. The capsule 54 includes a front portion 150, a rear portion 152 opposing the front portion 150, and a capsule sidewall 154 extending between the front portion 150 and the rear portion 152. According to various aspects, the capsule 54 defines a shape that coincides or differs with the shape of the reservoir housing 70. For example, the capsule 54 may define a cylindrical shape that coincides with a cylindrical shape of the reservoir housing 70. In such examples, the front portion 150 of the capsule 54 is proximate the front section 80 of the reservoir housing 70, and the rear portion 152 of the capsule 54 is likewise proximate the rear section 82 of the reservoir housing 70.

Referring again to FIGS. 4-10, the capsule 54 defines a receiving cavity 160 within the capsule 54. In some examples, the receiving cavity 160 is defined by the space encircled by the sidewall 154 and rear portion 152 of the capsule 54. According to various aspects, the receiving cavity 160 is configured to receive and contain the fluid and the microplastics 32, as provided herein.

The capsule 54 defines a capsule opening 170 that provides access to the receiving cavity 160. In various aspects, the capsule opening 170 is defined on the front portion 150 of the capsule 54 such that a capsule rim 172 can be at least partially defined by the capsule opening 170. In such aspects, the capsule rim 172 may generally align with the reservoir housing rim 102. The capsule opening 170 may define various shapes and sizes that coincide with the shape and/or size of a plunger assembly 180, as provided herein.

For example, the capsule opening 170 may have a width and round shape that permits insertion of the plunger assembly 180 into the capsule opening 170 and then the receiving cavity 160.

Figure 5:
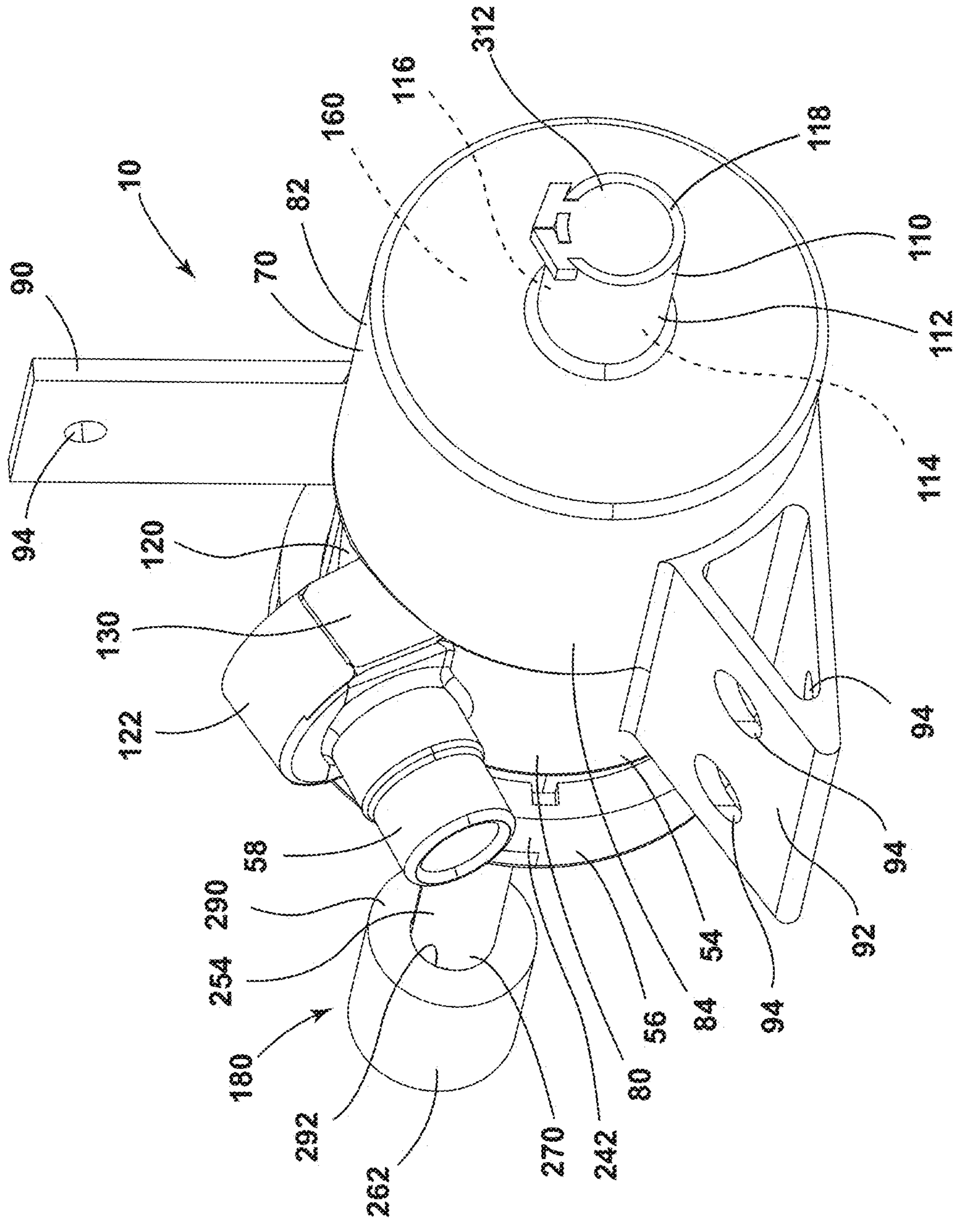
FIG. 5 is a side perspective view of the particulate reservoir with the plunger assembly of FIG. 4, according to an aspect of the present disclosure.
Figure 6:
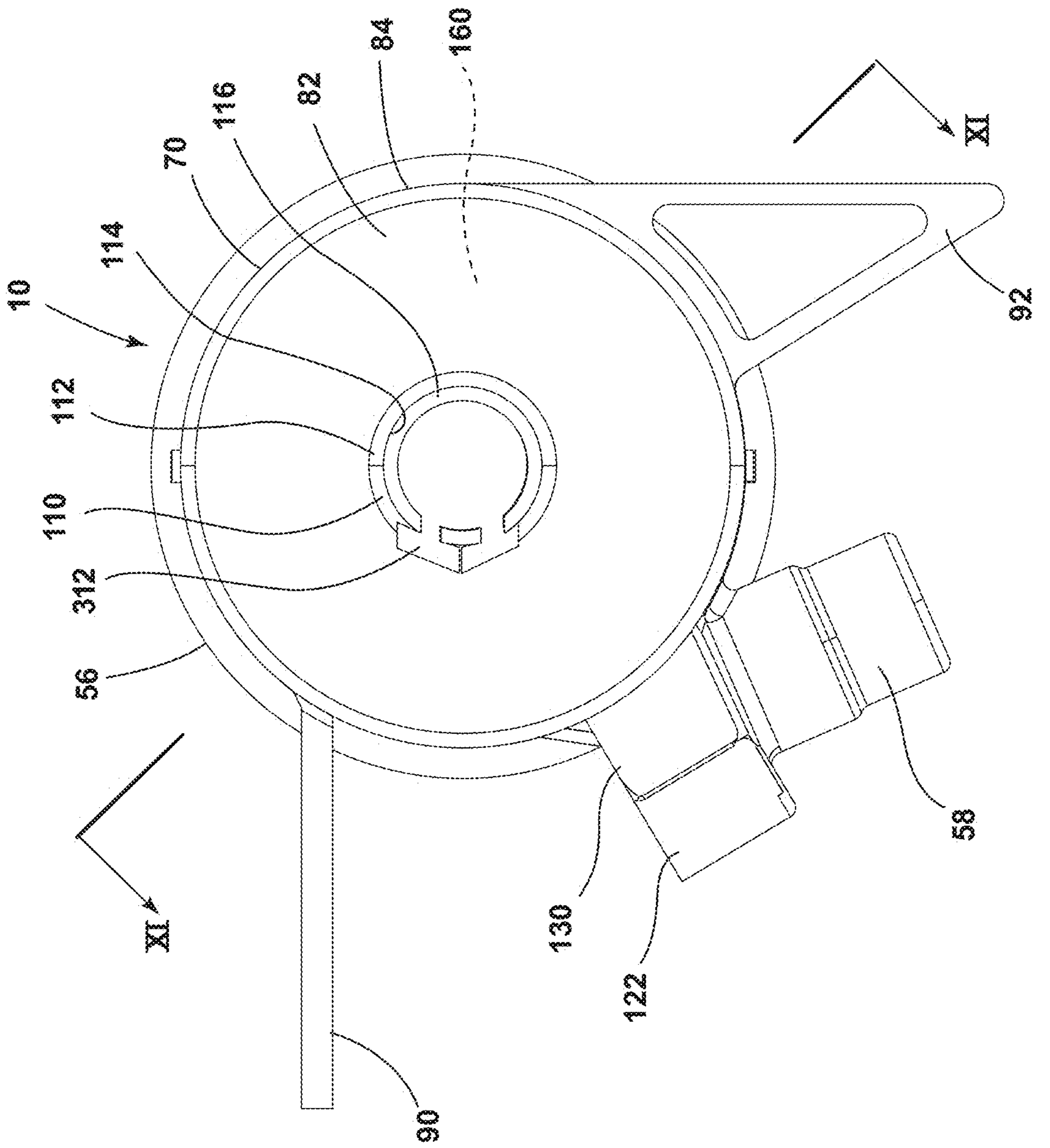
FIG. 6 is a side elevational view of the particulate reservoir with the plunger assembly of FIG. 4, according to an aspect of the present disclosure.

Referring now to FIGS. 5, 6 and 8, the capsule 54 includes the nozzle base 122. The nozzle base 122 can be coupled to the sidewall 154 of the capsule 54, or the nozzle base 122 can be integrally formed with the sidewall 154 and protrude outward from the sidewall 154. The nozzle base 122 includes a front surface 190, a rear surface 192 opposing the front surface 190, a bottom surface 194 extending between the front surface 190 and the rear surface 192, and an outer surface 196 extending from the sidewall 154 and towards the bottom surface 194. According to various aspects, the nozzle base 122 defines a nozzle base aperture 198 on the bottom surface 194. The nozzle base aperture 198 is configured to permit the flow of fluid from the nozzle 58, through the nozzle base 122, and into the receiving cavity 160.

In various aspects, the nozzle base 122 may include a butterfly valve 210 disposed within the nozzle base 122. The butterfly valve 210 can be disposed within the nozzle base 122 such that the butterfly valve 210 is positioned within a flow path of the fluid through the nozzle base 122. According to various aspects, the butterfly valve 210 can regulate the flow of fluid and particulates into the receiving cavity 160 as the plunger assembly 180 moves towards the rear portion 152 of the capsule 54.

According to various aspects, as exemplified in FIGS. 9 and 10, the capsule 54 includes a sidewall aperture 220 that extends from an inner surface 222 of the sidewall 220 to an outer surface 224 of the sidewall 154. In some examples, the sidewall aperture 220 is defined on the sidewall 154 such that the sidewall aperture 220 generally aligns with the nozzle base 122. The sidewall aperture 220 has a shape and/or size that coincides with the shape, placement, and/or size of the nozzle base 122. According to various aspects, the sidewall aperture 220 is configured to permit the transfer of fluid and the microplastics 32 from the nozzle base 122, through the sidewall aperture 220, and into the receiving cavity 160.

Referring further to FIGS. 4-10, the capsule 54 includes the capsule outlet 116 at the rear portion 152 of the capsule 54. The capsule outlet 116 includes a capsule outlet body 230 that extends outward from the rear portion 152 and a fluid channel 232 that extends through the capsule outlet body 230. According to various aspects, the capsule outlet body 230 extends outward from the rear portion 152 and through the outlet channel 114 that extends through the outlet body 230. The capsule outlet body 230 can define one of various shapes, such as a cylindrical shape that coincides with the cylindrical shape of the outlet body 112 of the reservoir housing outlet 110. The fluid channel 232 extends from the rear portion 152 of the capsule 54 through the capsule outlet body 230, and to an end 234 of the capsule outlet body 230. According to various aspects, the fluid channel 232 is configured to permit the flow of fluid from the receiving cavity 160, through the fluid channel 232, and out of the particulate reservoir 10.

Referring now to FIGS. 2-10, the particulate reservoir 10 includes the cap 56 disposed over the front section 80 of the reservoir housing 70 and the front portion 150 of the capsule 54. The cap includes a center portion 240 and an outer portion 242 encircling the center portion 240. In some aspects, the center portion 240 may define a shape that coincides with the shape of the reservoir housing 70 and/or the capsule 54. For example, the center portion 240 can define a rounded shape that coincides with the cylindrical shape of the reservoir housing 70 and the capsule 54. The center portion 240, in some aspects, has a width that extends across the reservoir housing rim 102 such that an interior surface 244 of the center portion 240 abuts the capsule rim 172 and operably seals the receiving cavity 160, which is interior of the rim 172. The cap 56 and the front portion 150 of the capsule 54 can include various alignment features that align the cap 56 relative to the capsule 54. The cap 56 and the capsule 54 can also define various securing features that selectively secure the cap 56 to the capsule 54. The alignment features and securing features can include interference mechanisms, twist-lock mechanisms, and other various aligning and securing features.

According to various aspects, the outer portion 242 of the cap 56 encircles the center portion 240 and extends outward from the center portion 240 and towards the reservoir housing 70. As illustrated in FIGS. 9 and 10, the outer portion 242 can extend towards the reservoir housing 70 and encircle the outer wall 84 of the reservoir housing 70 and the sidewall 154 of the capsule 54. In such aspects, the outer portion 242 may abut the sidewall of the reservoir housing 70 such that the cap 56 is coupled to the front section 80 of the reservoir housing 70.

Referring to FIGS. 4 and 7-10, the cap 56 defines a shaft aperture 250 that extends from an exterior surface 252 of the center portion 240 to the interior surface 244 of the center portion 240. In some aspects, the shaft aperture 250 may be concentric with the center portion 240 such that the shaft aperture 250 is centered on the center portion 240. The shaft aperture 250 has a shape and size that coincides with the shape and size of a shaft 254. The coinciding shape of the shaft aperture 250 permits extension of the shaft 254 through the aperture 250 and into the reservoir cavity 70.

Referring again to FIGS. 4 and 7-10, the cap 56 includes a travel stop 260. In some examples, the cap 56 can include multiple travel stops 260. For example, the cap 56 can include a pair of travel stops 260. The travel stop 260 can be coupled to the exterior surface 252 of the cap 56, or the travel stop 260 may be integrally formed with the cap 56. The travel stop 260 can protrude outward from the exterior surface 252 of the cap 56. For example, the cap 56 can include a pair of travel stops 260 on opposing sides of the shaft aperture 250 that each extend outward from the exterior surface 252. According to various aspects, the travel stop 260 is configured to abut a shaft handle 262 as the plunger assembly 180 travels downward and towards the rear portion 152 of the capsule 54, as provided herein. Additionally, or alternatively, it is generally contemplated that the length of protrusion of the travel stop 260 can be at least partially determined by the length of the shaft 254, the distance between the front portion 150 and the rear portion 152 of the capsule 54, and/or various other factors.

Referring to FIGS. 1-5 and 7-10, the particulate reservoir 10 includes the plunger assembly 180. The plunger assembly includes the shaft 254, the shaft handle 262 coupled to a first end 270 of the shaft 254, and a capsule seal 272 coupled to an opposing, second end 274 of the shaft 254. According to various aspects, the plunger assembly 180 is movable between a first position when the particulate reservoir is in the static condition 50, and a second position when the particulate reservoir is in the compressed condition 52. In the static condition 50, the capsule seal 272 is proximate the interior surface 244 of the central portion 240 of the cap 56 and the space within the reservoir cavity 70 is maintained in the static condition 50. In the compressed condition 52, the capsule seal 272 translates axially towards the rear portion 152 such that fluid is pressed through a filtration membrane

276 that is coupled to the rear portion 152 and disposed over the outlet channel 114. The fluid then translates through the filtration membrane 276 and out of the reservoir cavity 70. As a result, the microplastics 32 are compressed within the reservoir cavity 70 to form a compressed puck of microplastics 32 that can be disposed of, as provided herein.

Referring again to FIGS. 1-5 and 7-10, the plunger assembly 180 includes the shaft 254. The shaft 254 is coupled to the cap 56 and extends through the shaft aperture 250. In some examples, the shaft 254 abuts a shaft support member 280 that encircles the shaft aperture 250 and extends outward from the exterior surface 252 of the cap 56. According to various aspects, the shaft defines one of various shapes, such as a cylindrical shape, as illustrated in FIGS. 9 and 10. The shaft 254 is translatable through the shaft aperture 250 as the plunger assembly 180 moves between the static condition 50 and the compressed condition 52.

Referring further to FIGS. 3-5 and 7-10, the plunger assembly includes the shaft handle 262 that is coupled to the first end 270 of the shaft 254. The shaft handle 262 includes a central segment that has a width greater than a width of the shaft 254. The greater width of the central portion 240 is such that the central portion 240 may be grasped and a pulling or pushing force is applied to the shaft handle 262. The shaft handle 262 includes an inner segment 290 that defines a shaft handle cavity 292. The shaft handle cavity 292 has a shape and size that permits insertion of the first end 270 of the shaft 254 into the shaft handle cavity 292. According to various aspects, the inner segment 290 is configured to abut the travel stop 260 as the plunger assembly 180 translates to the compressed condition 52.

Referring further to FIGS. 8-10, the plunger assembly 180 includes the capsule seal 272 coupled to the second end 274 of the shaft 254. The capsule seal 272 includes an engagement portion 300, an inside portion 302 opposing the engagement surface 300, and an outer surface 304 encircling the engagement portion 300 and the inside portion 302. In the static condition 50, the engagement portion 300 is distal from the rear portion 152 of the capsule 54 and the inside portion 302 is near, or is abutting, the interior surface 244 of the cap 56. As the plunger assembly 180 moves to the compressed condition 52, the engagement portion 300 travels towards the rear portion 152 until the engagement portion 300 is proximate to the rear portion 152 and abutting and compressing the microplastics 32. At the same time, now filtered fluid travels through the filtration membrane positioned within the rear portion 152 and through the outlet channel 114 that extends through the outlet body 230. The now filtered fluid is then directed into the fluid flow system 30. According to various aspects, the distance between the capsule seal 272 and the rear portion 152 of the capsule 54 when the plunger assembly 180 is in the compressed condition 52 can be at least partially determined by the size of the travel stop 260, the amount of microplastics 32 in the reservoir cavity 70, and/or various other aspects of the particulate reservoir 10.

According to various aspects, the capsule seal 272 may be comprised of various materials that assist in defining a sealed interface between the capsule seal 272 and the capsule 54. For example, the capsule seal 272 may be comprised of a rubber, an elastomer, a sealing plastic, and/or various other sealing materials. Additionally, the plunger assembly 180 may include various other sealing elements that assist in defining the sealed interface. For example, a sealing element 310, such as a gasket with a shape coinciding with the shape of the capsule seal 272, may be disposed between the capsule seal 272 and the cap 56. In such examples, the sealing element 310 may compress as the sealing element 310 abuts the interior surface 302 of the cap 56 and the inside surface 302 of the capsule seal 272 when the plunger assembly 180 is in the static condition 50.

As the capsule seal 272 travels towards the rear portion 152, a compressive force is exerted on the fluid within the reservoir cavity 70. To regulate the flow of the fluid out of the reservoir cavity 70 via the fluid channel 232 as the compressive force is exerted, the particulate reservoir 10 can include a flapper valve 312. The flapper valve 312 may be coupled to the end 234 of the capsule outlet body 230 and the fluid channel 232. According to various aspects, the flapper valve 312 may operably regulate the flow of the fluid out of the fluid channel 232 as the flapper valve 312 toggles between a closed or opened condition.

Additionally or alternatively, it is generally contemplated that the particulate reservoir 10 may include a drive assembly that assists in translating the plunger assembly 180 between the static condition 50 and the compressed condition 52. In some aspects, the drive assembly can be comprised of a gear set that assists in permitting translation. For example, the drive assembly may be comprised of one or more worm gears, helical gears, and/or a rack and pinion gear set that permits linear travel as a rotational force is applied to the shaft handle 262.

Referring now to FIGS. 11-21, the particulate reservoir 10 can include a filter assembly 315 to remove the microplastics 32 from the fluid. The filter assembly 315 is disposed within the cabinet 12 of the appliance 14 such that the filter assembly 315 is in fluid communication with the fluid that is being processed within the appliance 14. According to various aspects, the filter assembly 315 removes the microplastics 32 from the fluid as permits disposal of the microplastics 32, as provided herein. In certain aspects of the device, the various configurations of the filter assembly 313 can be incorporated into the plunger assembly 180 for filtering microplastics 32.

Referring again to FIGS. 11-21, in aspects where the particulate reservoir 10 includes the filter assembly 315, the capsule 54 includes a frame structure 320 and a plurality of apertures 322 defined along the sidewall 154 of the capsule 54. The frame structure 320 and the plurality of apertures 322 together define a filter body 324. The filter body 324 can further include a mesh, such as a screen that encircles the plurality of apertures 322, that is disposed over the plurality of apertures 322. According to various aspects, the filter body 324 can receive and store the microplastics 32 from the hydrocyclone separator 34, and/or by being disposed within a fluid flow path of the fluid. Once the microplastics 32 are disposed within the filter body 324, the filter body 324 may be configured such that the fluid is permitted to flow out of the filter body 324, while the microplastics 32 are maintained within the filter body 324. For example, the plurality of apertures 322 and/or the mesh may be of a size that is lesser than the size of the microplastics 32 but large enough to permit the flow of fluid.

Referring to FIGS. 11-21, a stem 330 extends off of a first end 332 of the filter body 324. The stem 330 can be coupled to the first end 332 or can be integrally formed with the first end 332. In some examples, the stem 330 can be coupled to the first end 332 of the filter body 324 and be configured to extend through the first end 332. For example, the first end 332 may define a stem aperture 334 that permits extension of the stem 330 into the filter body 324, as provided herein. The stem 330 can define one of various shapes, such as a cylindrical shape, a cross shape, or one of other various shapes. The stem 330 can likewise have various lengths. For example, the stem 330 can have a length that permits extension of the stem 330 through the stem aperture 334 and towards a second end 336 of the filter body 324.

According to various aspects, the stem 330 extends away from the first end 332 of the filter body 324 and couples to a stem head 340. The stem head 340 secures the particulate reservoir 10 to a filtration chamber within the appliance 14. In some examples, the stem head 340 includes threading 342 to assist in coupling the stem head 340 to an external filtration chamber or other substrate, such as the cabinet 12. According to various aspects, the stem head 340 can include additional elements, such as interfacing tabs 344 that permit grasping and subsequent travel and/or rotation of the stem head 340, as provided herein. The stem head 340 can be used to disengage the filter assembly 315. After being disengaged, the stem head 340 can be used to remove the filter assembly from the particulate reservoir 10 and, in particular, from the reservoir housing 70.

It is also contemplated, in certain aspects of the device, that after the stem head 340 is disengaged from the reservoir housing 70, the stem head can be used to operate the stem 330 and a wiper 360 relative to the filter body 324. In such an aspect of the device, the filter body 324 can be maintained within the filter reservoir 70.

Referring now to FIGS. 16, 17, 20 and 21, the filter body 324 defines a wiper aperture 350 on the second end 336 of the filter body 324. The wiper aperture 350 defines a shape that may coincide with the shape of the filter body 324. For example, the wiper aperture 350 can have a rounded shape that coincides with the cylindrical shape of the filter body 324. According to various aspects, the wiper aperture 350 permits insertion of a wiper 360 into the filter body 324.

Figure 13:
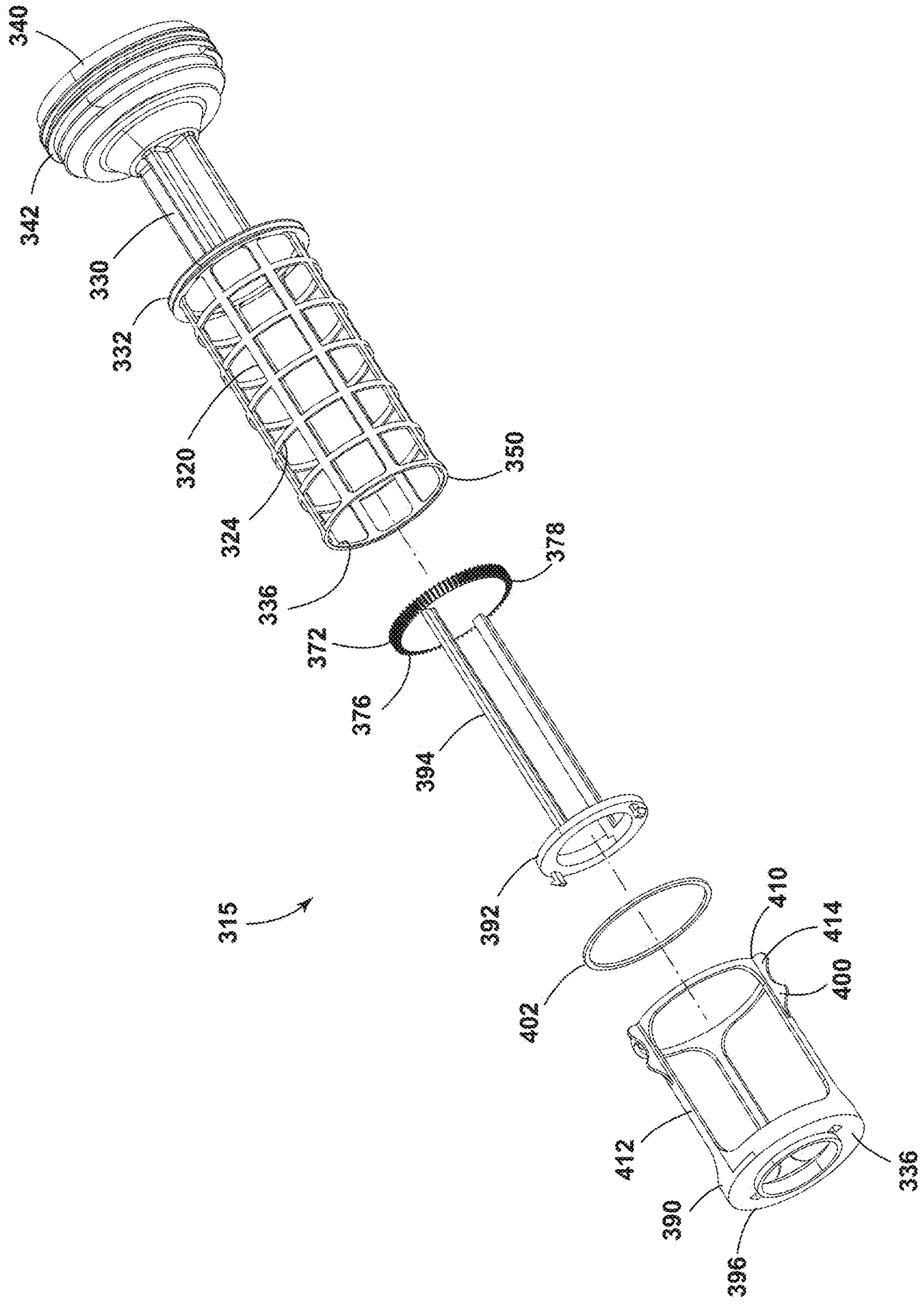
FIG. 13 is a partially exploded, side perspective view of the particulate reservoir of FIG. 12, according to an aspect of the present disclosure.
Figure 14:
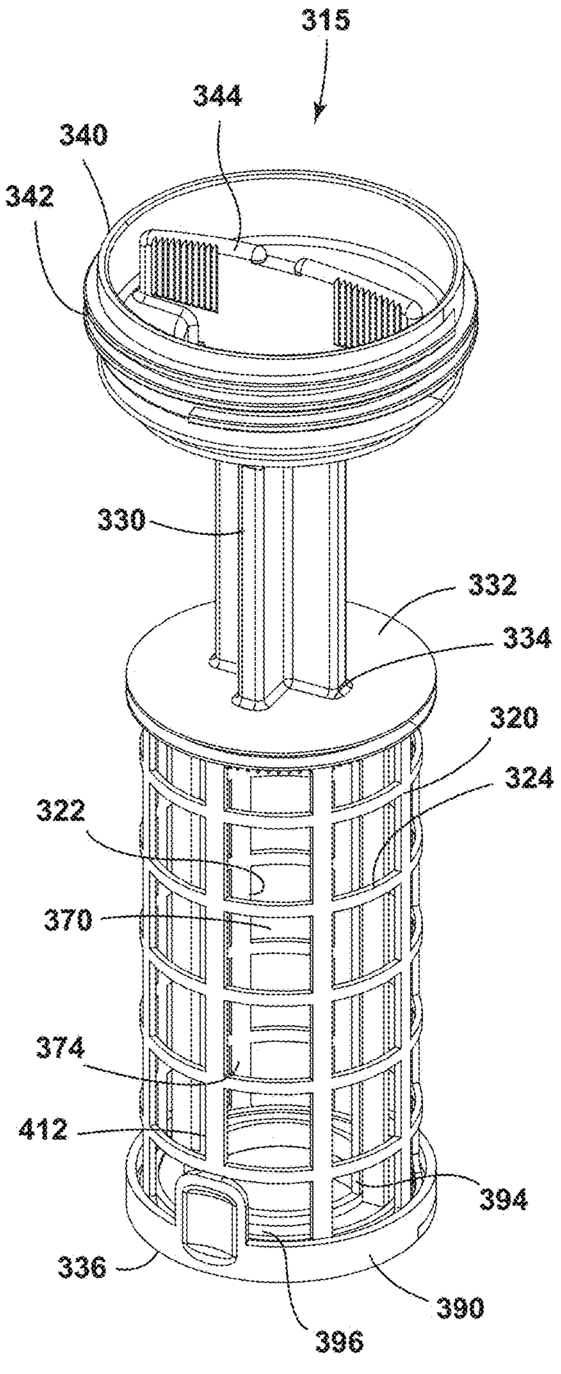
FIG. 14 is a side perspective view of a particulate reservoir with a filter assembly that has a handle and a wiper coupled to the handle, according to an aspect of the present disclosure.
Figure 15:
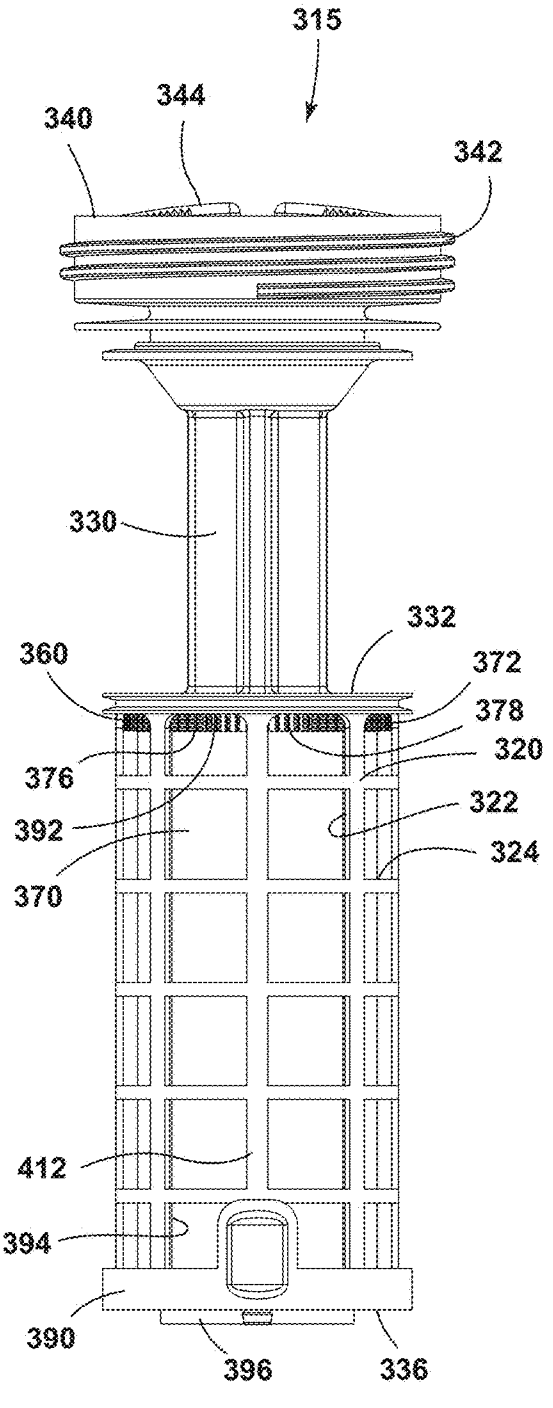
FIG. 15 is a side elevational view of a particulate reservoir with a filter assembly that has a handle and a wiper coupled to the handle, according to an aspect of the present disclosure.

Referring to FIG. 13, the wiper 360 is operably inserted into an inner cavity 370 of the filter body 324 via the wiper aperture 350. The wiper 360 has a wiper head 372 that has shape and/or size that coincides with the shape and/or size of an inner sidewall 374 that encircles the inner cavity 370. For example, the wiper head 372 can have a rounded shape such that an outer rim 376 of the wiper 360 abuts the inner sidewall 374. According to various aspects, the wiper head 372 is configured to slidably engage the inner sidewall 374 of the filter body 324 and scrape away the microplastics 32 and particulates that accumulate on the sidewall 374. Additionally, it is generally contemplated that the wiper head 372 can include bristles 378 extending outward from the outer rim 376 of the wiper head 372. The bristles 378 can engage the sidewall 374 of the filter body 324 and at least partially assist in scraping away microplastics 32 from the sidewall 374.

According to the various aspects of the device, it is also contemplated that the wiper 360 can be used to compress the microplastics 32 within the filter body 324 to form the compressed puck of microplastics 32. Is such as aspect of the device, the filter body 324 can be periodically removed from the filter reservoir 70 to disposed of the accumulated puck of microplastics 32. The puck of microplastics can accumulate over several operations of the wiper 360. In this manner, numerous cycles of the appliance 14 can be operated before the puck of microplastics 32 needs to be disposed from the filter body 324.

Referring now to FIGS. 11-15. The wiper 360 can be coupled to a handle 390 that permits translation of the wiper 360 through the inner cavity 370 of the filter body 324. In various aspects, the wiper 360 is coupled to the handle 390 via a wiper base section 392 and one or more extension sections 394 extending off of the base section 392 and towards the wiper head 372. The base section 392 is coupled to a base portion 396 of the handle 390 and the extension sections 394 extend from the base section 392 and to the wiper head 372. According to various aspects, the handle 390 permits a user to grasp the handle 390 and move the handle 390 such that the wiper 360 is translated along the inner cavity 370 of the filter body 324, as provided herein.

Figure 11:
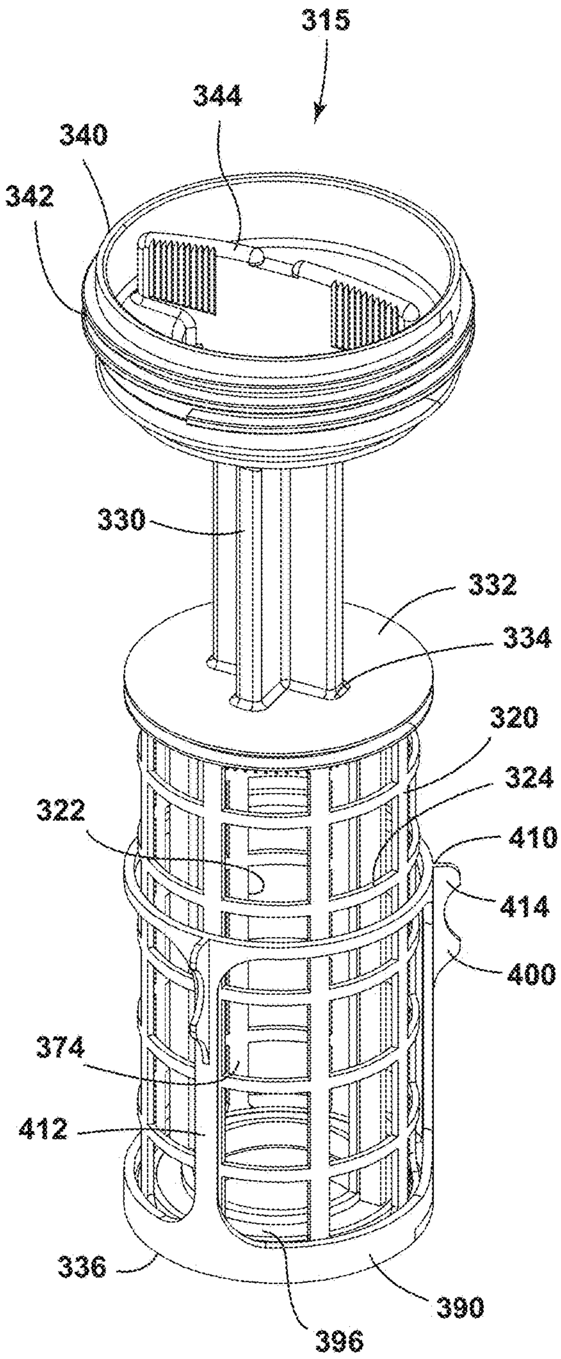
FIG. 11 is a side perspective view of a particulate reservoir with a filter assembly that has a handle and a wiper, according to an aspect of the present disclosure.
Figure 12:
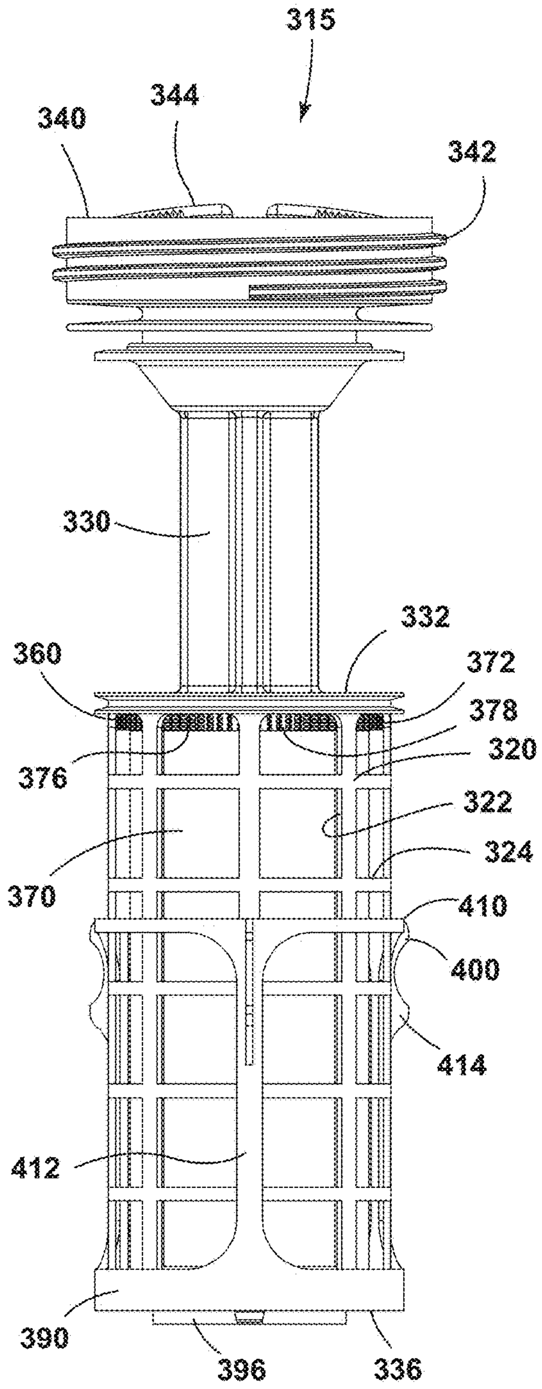
FIG. 12 is a side elevational view of a particulate reservoir with a filter assembly that has a handle and a wiper, according to an aspect of the present disclosure.

Referring now to FIGS. 11-13, the handle 390 includes the base portion 396 and a grasping portion 400 that extends outward from the base portion 396 and encircles the filter body 324. In some aspects, the base portion 396 operably abuts the second end 336 of the filter body 324 and is slightly oversized relative to the second end 336. In such aspects, the base portion 396 is couplable to the base section 392 such that the extension sections 394 and the wiper head 372 are operably disposed within the inner cavity 370. In such aspects, a sealing gasket 402 can be disposed between the base section 392 and the base portion 396 of the handle 390. According to various aspects, the base portion 396 can operably seal the filter body 324 such that microplastics 32 and various other particulates are maintained within the inner cavity 370 of the filter body 324.

According to various aspects, the grasping portion 400 of the handle 390 extends from the base portion 396 and towards the filter body 324. In some aspects, the grasping portion 400 extends towards the filter body 324 and encircles the filter body 324. For example, the grasping portion 400 can include a handle ring 410 that encircles the filter body 324 and one or more handle supports 412 extending from the base portion 396 and to the handle ring 410. According to various aspects, a user, desiring to move the wiper 360 along the filter body 324, can grasp the handle 390 and translate the handle 390 along a length of the filter body 324. As the user moves the handle 390, the wiper 360 will likewise move due to the coupling between the base section 392 and the base portion 396 of the handle 390. In such aspects, the handle 390 can include additional elements that assist in moving the handle 390. For example, the handle 390 can include finger holds 414 that extend outward from each handle support 412.

Figure 16:
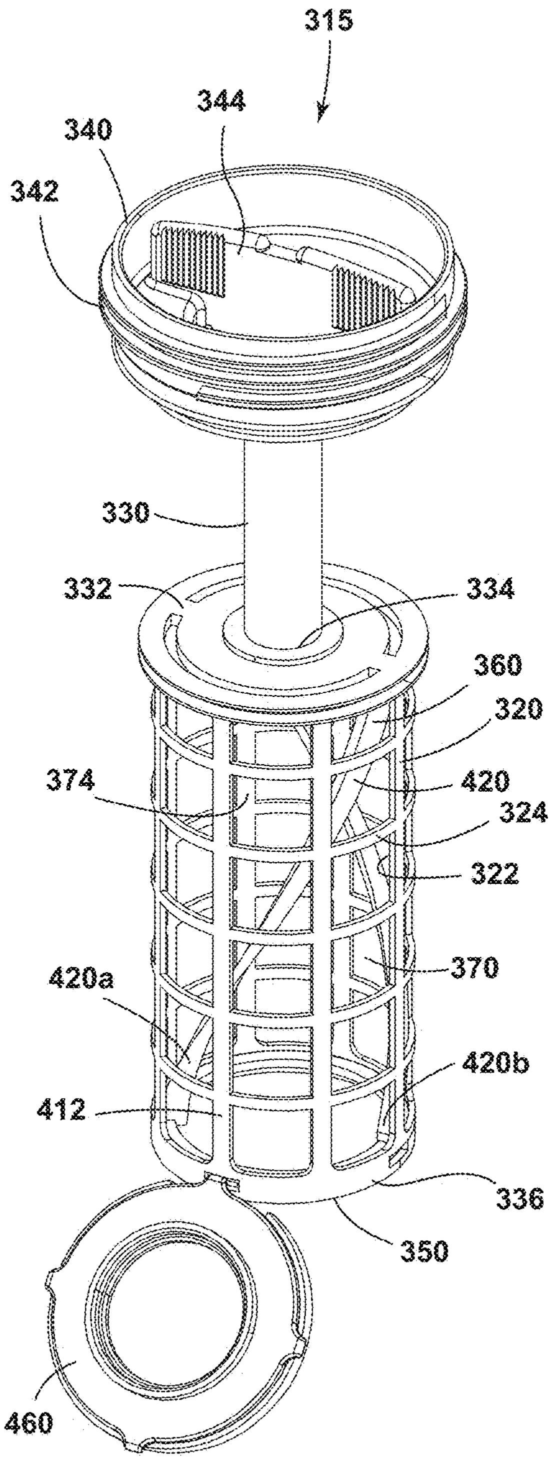
FIG. 16 is a side perspective view of a particulate reservoir with a filter assembly and a wiper band, according to an aspect of the present disclosure.
Figure 17:
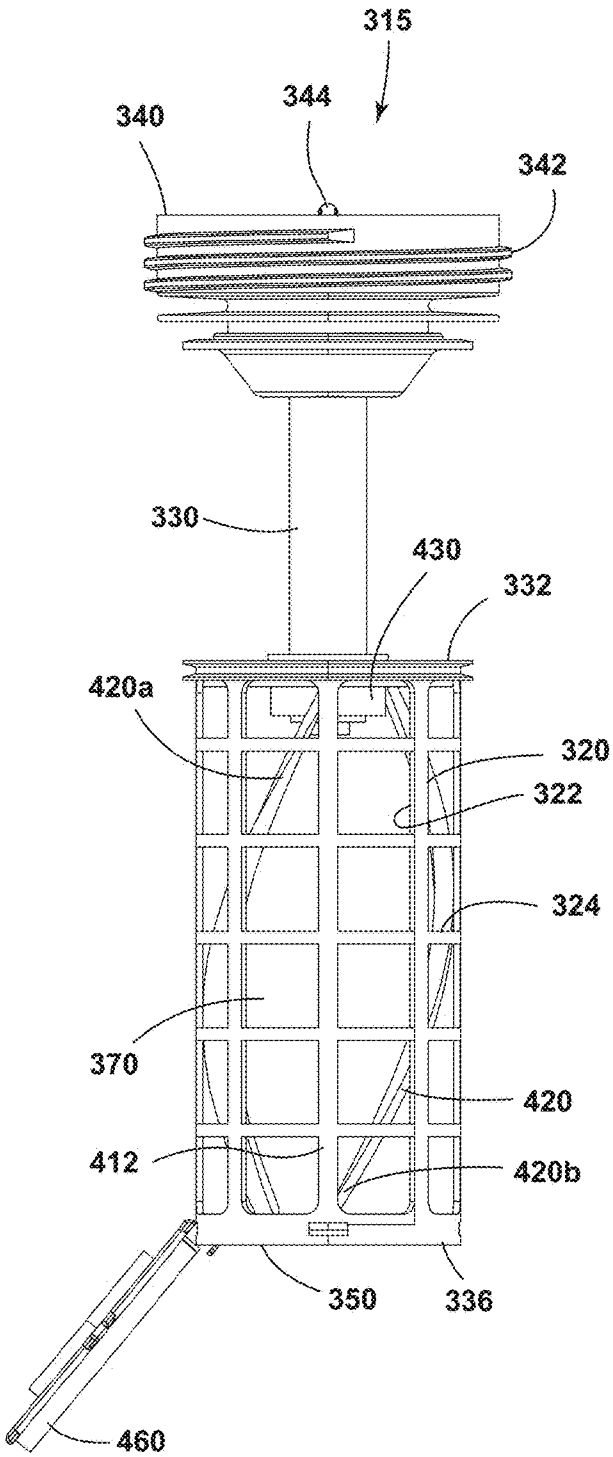
FIG. 17 is a side elevational view of a particulate reservoir with a filter assembly and a wiper band, according to an aspect of the present disclosure.
Figure 18:
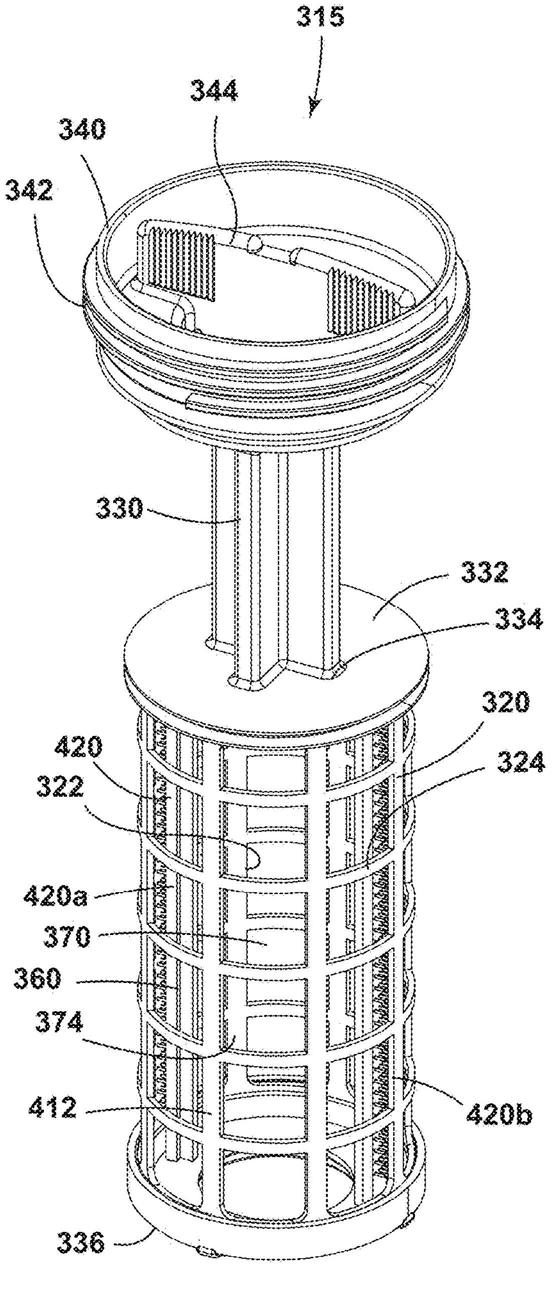
FIG. 18 is a side perspective view of a particulate reservoir with a filter assembly and a wiper band, according to an aspect of the present disclosure.
Figure 19:
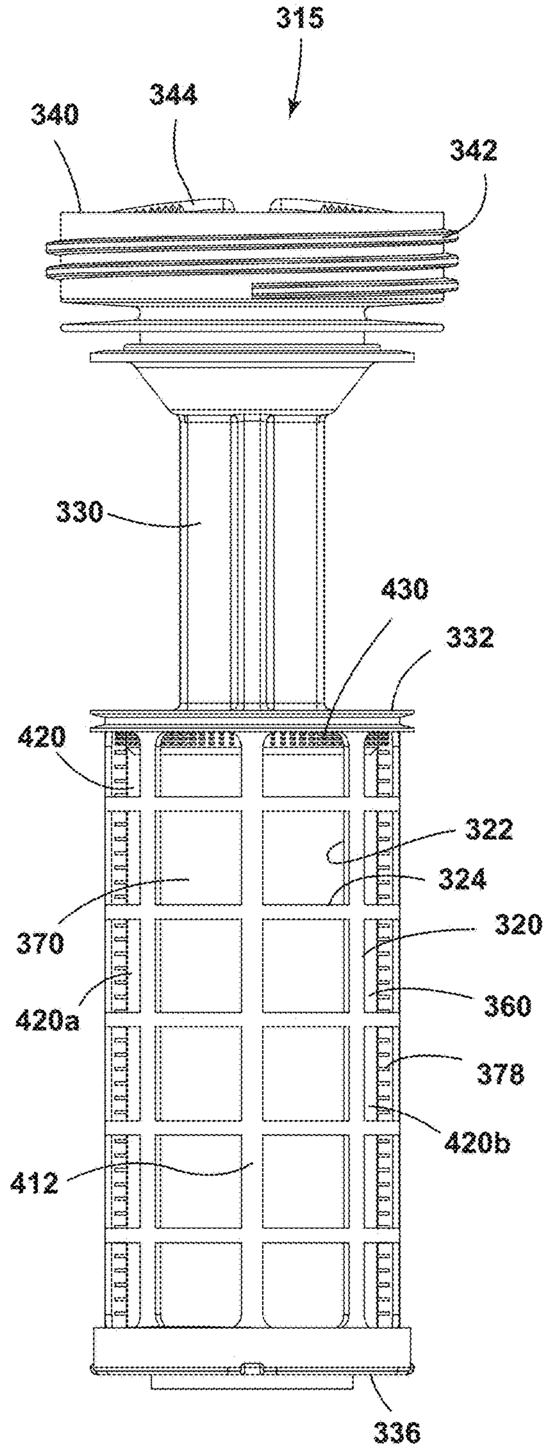
FIG. 19 is a side elevational view of a particulate reservoir with a filter assembly and a wiper band, according to an aspect of the present disclosure.

Referring now to FIGS. 16-19, the wiper 360, in some aspects, is a wiper band 420 disposed within the inner cavity 370. The wiper band 420 extends from the first end 332 to the second end 336 of the filter body 324. In various aspects, the wiper band 420 can be disposed in a spiral configuration such that the wiper band 420 extends along the sidewall 374 of the filter body 324 in a spiral configuration from the first end 332 to the second end 336, as illustrated in FIGS. 16 and 17. In other aspects, the wiper band 420 extends front the first end 332, along the length of the filter body 324 where the wiper band 420 is generally parallel with the sidewall 374, and to the second end 336, while also maintaining an abutment with the sidewall 374 of the filter body 324, as illustrated in FIGS. 18 and 19.

In some aspects, the wiper band 420 can include a first wiper band 420*a* disposed within the filter body 324 and a second wiper band 420*b* disposed within the filter body 324 and generally mirroring the first wiper band 420*a*. The first wiper band 420*a* and the second wiper band 420*b* can be coupled to an end portion 430 of the stem 330 such that the first wiper band 420*a* and the second wiper band 420*b* rotatably engage the sidewall 374 as a rotational force is applied to the stem 330. According to various aspects, the engagement between the first wiper band 420*a* and the second wiper band 420*b* is such that the first wiper band 420*a* and the second wiper band 420*b* scrape away microplastics 32 and other particulates that accumulate on the sidewall 374 of the filter body 324. Additionally, it is generally contemplated that the wiper band 420 can include bristles 378, and/or various other aspects that assist in removing the microplastics 32 from the sidewall 374.

Figure 20:
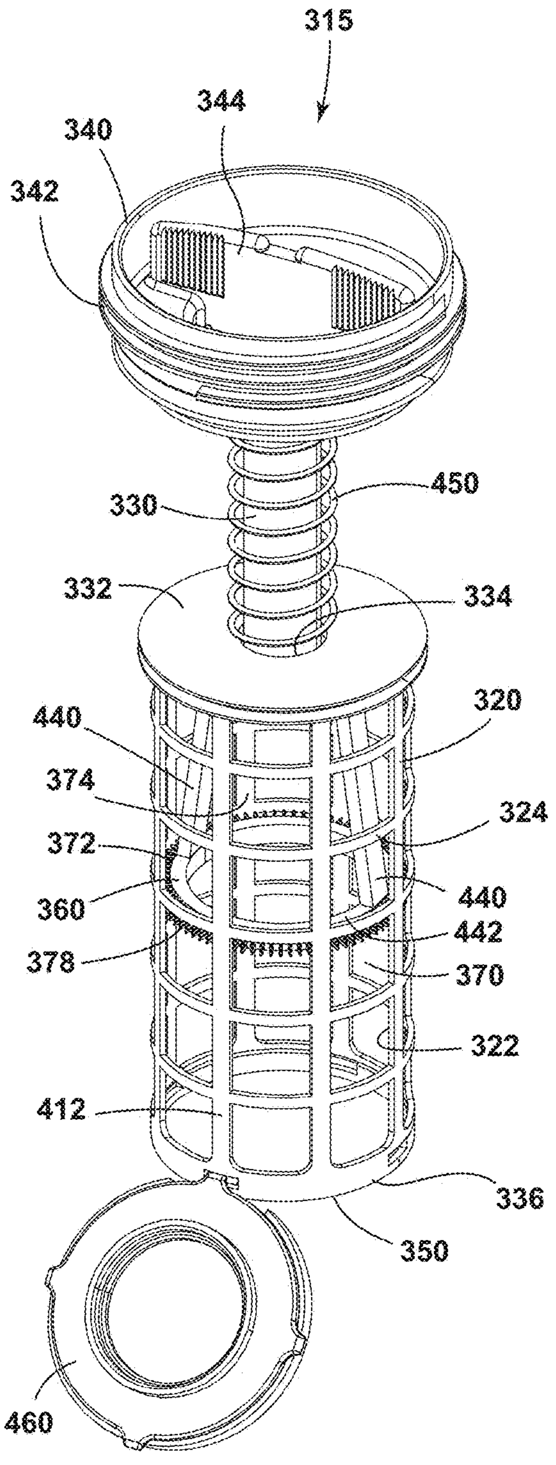
FIG. 20 is a side perspective view of a particulate reservoir with a first wiper and a second wiper spaced apart from the first wiper, according to an aspect of the present disclosure.
Figure 21:
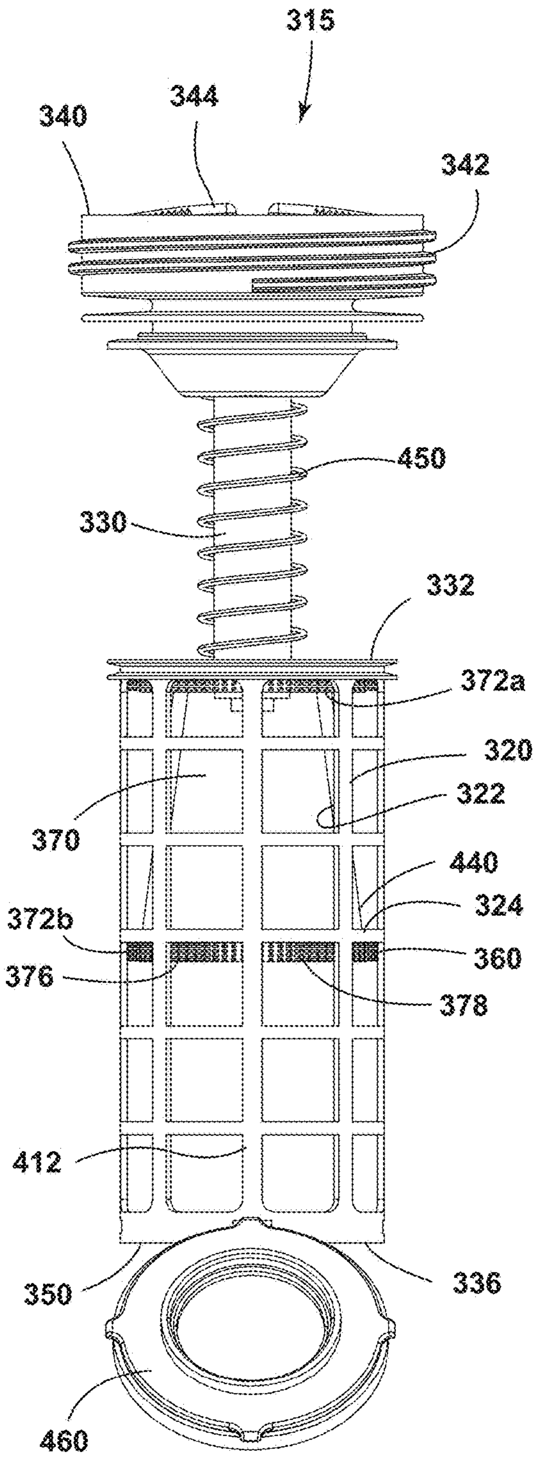
FIG. 21 is a side elevational view of a particulate reservoir with a first wiper and a second wiper spaced apart from the first wiper, according to an aspect of the present disclosure.
Figure 22:
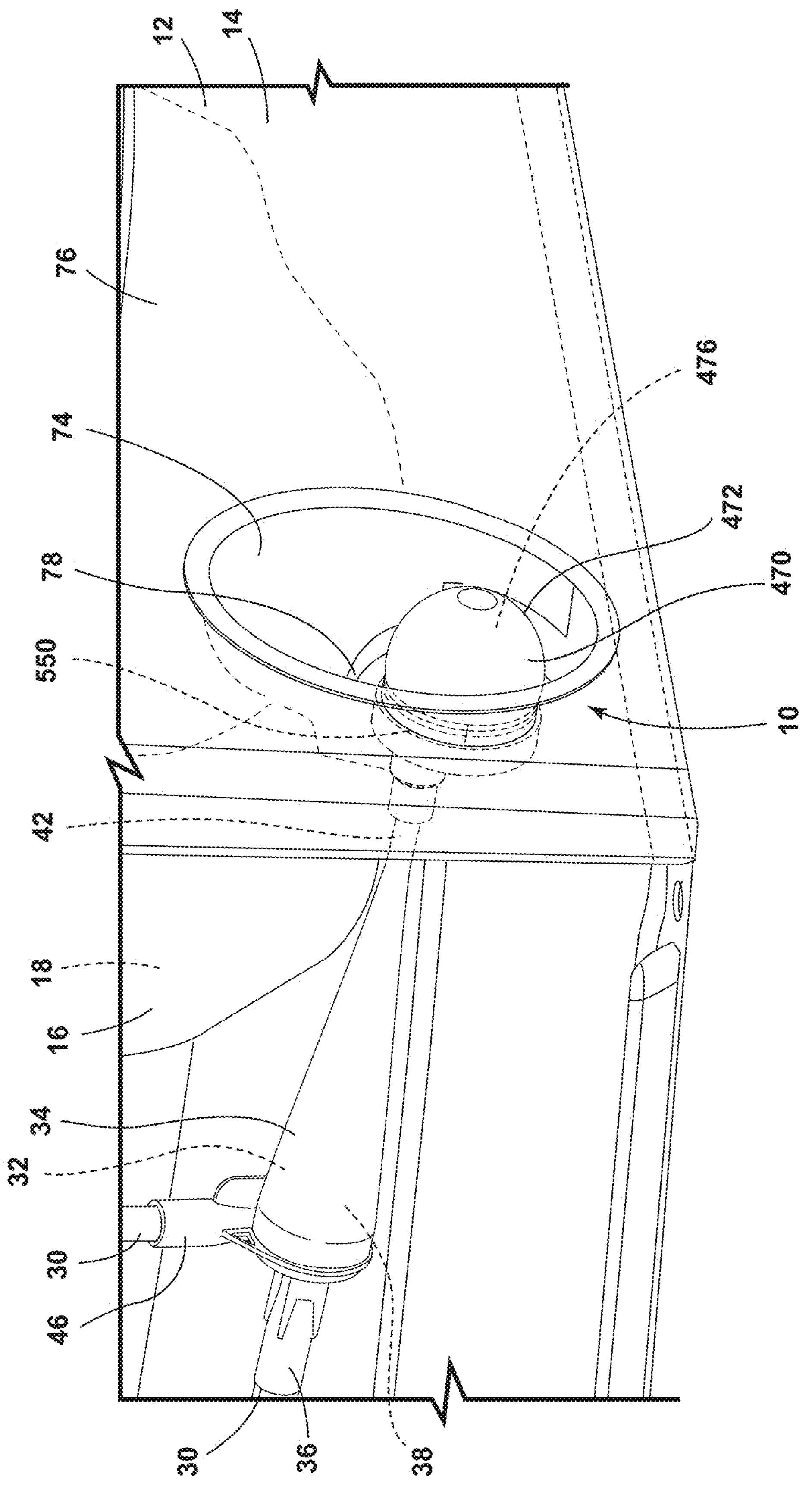
FIG. 22 is an enlarged, front perspective view of an appliance with a particulate reservoir that has a pliable capsule, according to an aspect of the present disclosure.
Figure 23:
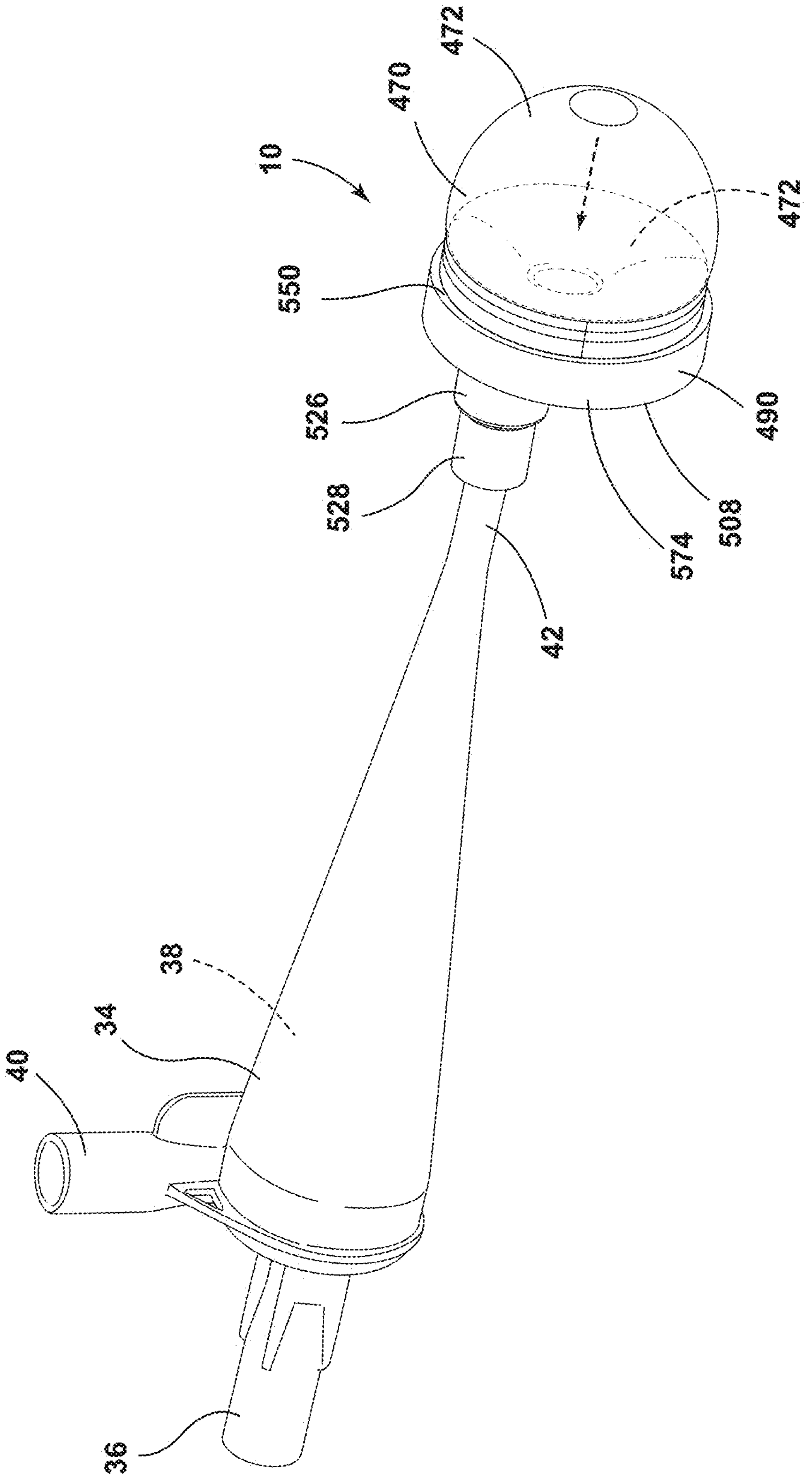
FIG. 23 is a side perspective view of a particulate reservoir coupled to a hydrocyclone separator, according to an aspect of the present disclosure.
Figure 24:
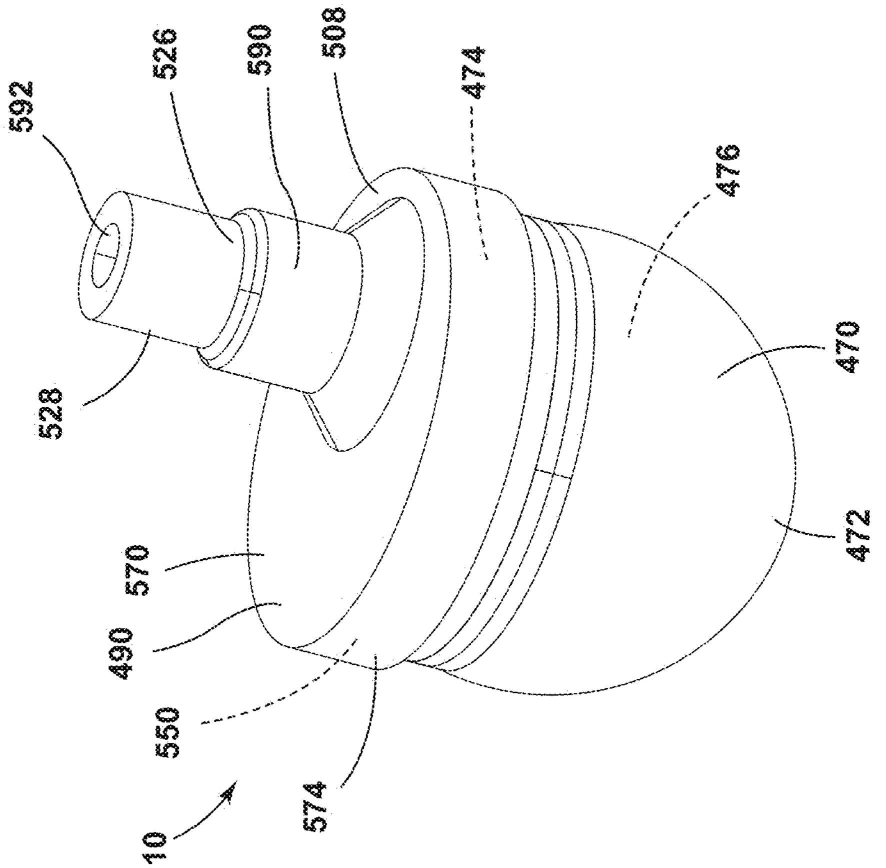
FIG. 24 is a side perspective view of a particulate reservoir with a pliable capsule, according to an aspect of the present disclosure.

Referring to FIGS. 20 and 21, the wiper head 372 of the wiper 360 is couplable to the stem 330. The wiper head 372 can be coupled to the end portion 430 of the stem 330. In various aspects, the wiper head 372 can be coupled to the end portion 430 of the stem 330 directly or via one or more wiper supports 440 that extend off of the end portion 430 and to the wiper head 372. In some examples, one or more wiper supports 440 may extend downward and outward from the end portion 430 and couple to an exterior portion 442 of the wiper head 372. In such examples, the wiper head 372 is spaced apart from the end portion 430 of the stem 330. According to various aspects, the wiper head 372 is coupled to the end portion 430 of the stem 330 such that a movement of the stem 330 towards the second end 336 of the filter body 324 likewise results in a movement of the wiper head 372 towards the second end 336. As the wiper head 372 moves towards the second end 336, the outer rim 376 of the wiper head 372, and/or the bristles 378 disposed thereon, scrape and remove microplastics 32 and other particulates that accumulate on the sidewall 374.

According to various aspects, a first wiper head 372*a* and a second wiper head 372*b* can be disposed within the inner cavity 370 of the filter body 324. The first wiper head 372*a* and the second wiper head 372*b* can have a configuration that coincides with the wiper head 372. The first wiper head 372*a* and/or the second wiper head 372*b* can be coupled to the end portion 430 of the stem 330, and the first wiper head 372*a* and the second wiper head 372*b* can be proximate or spaced apart from each other 372*a*, 372*b*. For example, the first wiper head 372*a* can be directly coupled to the end portion 430 and the second wiper head 372*b* can be coupled to the end portion 430 via the wiper support 440, where the length of the wiper support 440 is such that the second wiper head 372*b* is spaced apart from the first wiper head 372*a*. Either wiper head 372*a*, 372*b* has a shape and/or size that permits abutment of each wiper head 372*a*, 372*b* with the sidewall 374 of the filter body 324. According to various aspects, the first wiper head 372*a* and/or the second wiper head 372*b* can be coupled to the end portion 430 of the stem 330 such that movement of the stem 330 into the inner cavity 370 likewise permits movement of either the first wiper head 372*a* and/or the second wiper head 372*b*.

Referring to FIGS. 20 and 21, a biasing member 450 can be coupled to the stem 330 to assist in biasing the stem 330 out of the inner cavity 370. In some aspects, the biasing member 450 can abut the stem head 340 and the first end 332 of the filter body 324. For example, the biasing member 450 can be a coil spring that encircles the stem 330 and has opposing ends that abut the stem head 340 and the first end 332. The coil spring 450, when released from a compressed state, has a spring constant sufficient to bias the spring back to an uncompressed state, where the biasing towards the uncompressed state likewise moves the stem 330 towards the first end 332 of the filter body 324.

Referring now to FIGS. 16, 17, 20 and 21, the filter body 324 includes a disposal door 460 coupled to the second end 336 of the filter body 324. In some examples, the disposal door 460 is rotationally coupled to the filter body 324. For example, the disposal door 460 can be coupled to the second end 336 via one or more hinges. The disposal door 460 can have a shape and/or size that coincides with the shape of the filter body 324. In some aspects, the disposal door 460 can be slightly oversized relative to the second end 336 such that the disposal door 460 encircles the second end 336 and operably seals the second end 336. According to various aspects, the disposal door 460 is operably between a closed condition and opened condition. In the closed condition, the disposal door 460 operably seals the wiper aperture 350 defined at the second end 336 of the filter body 324 such that microplastics 32 within the filter body 324 are stored within the filter body 324. In the opened condition, the disposal door 460 is rotated away from the wiper aperture 350 such that microplastics 32 can be removed out of the filter body 324 via the second wiper aperture 350.

Referring to FIGS. 22-27, the particulate reservoir 10 can include a pliable capsule 470. The pliable capsule 470 includes a pliable body 472 (which may function as a plunger) and a neck 474 that extends off of the pliable body 472. The pliable body 472 generally defines a rounded shape that defines a pliable capsule reservoir 476 within the pliable body 472. The pliable body 472 is comprised of a compressible material, such as a compressible silicone, one or more elastomeric materials, one or more elastic and resilient polymers, combinations thereof and other similar material that permits compression of the pliable body 472. Compression of the pliable body 472 allows the volume of the pliable capsule reservoir 476 can vary. The pliable body 472 is configured to receive the fluid and microplastics 32 into the pliable capsule reservoir 476, where the particulates can then accumulate within the pliable capsule reservoir 476. The pliable capsule 470 can then be decoupled from the pliable capsule cap 490 and carried to an external storage structure, wherein the pliable capsule 470 can be inverted and the microplastics 32 disposed out of the pliable body 472. In certain aspects of the device, the pliable body 472 can be removed and replaced with a new pliable body 427. The removed pliable body 472 can then be disposed of or recycled as a single unit.

According to various aspects, the particulate reservoir 10 is in the static condition 50 when the pliable body 472 is in an uncompressed state, and the particulate reservoir 10 is in the compressed condition 52 when a compressive force is applied to the pliable body 472. As a compressive force is applied to the pliable body 472, the volume of the pliable capsule reservoir 476 decreases and a compressive force is exerted on the fluid.

Figure 25:
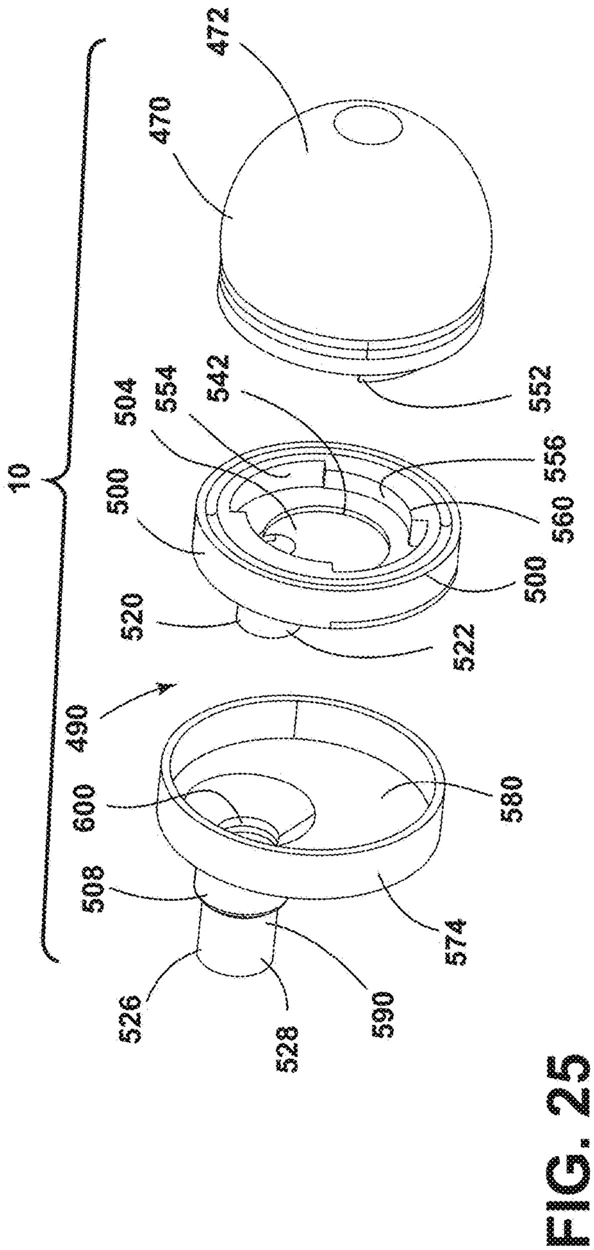
FIG. 25 is an exploded, side perspective view of a particulate reservoir with a pliable capsule, according to an aspect of the present disclosure.
Figure 26:
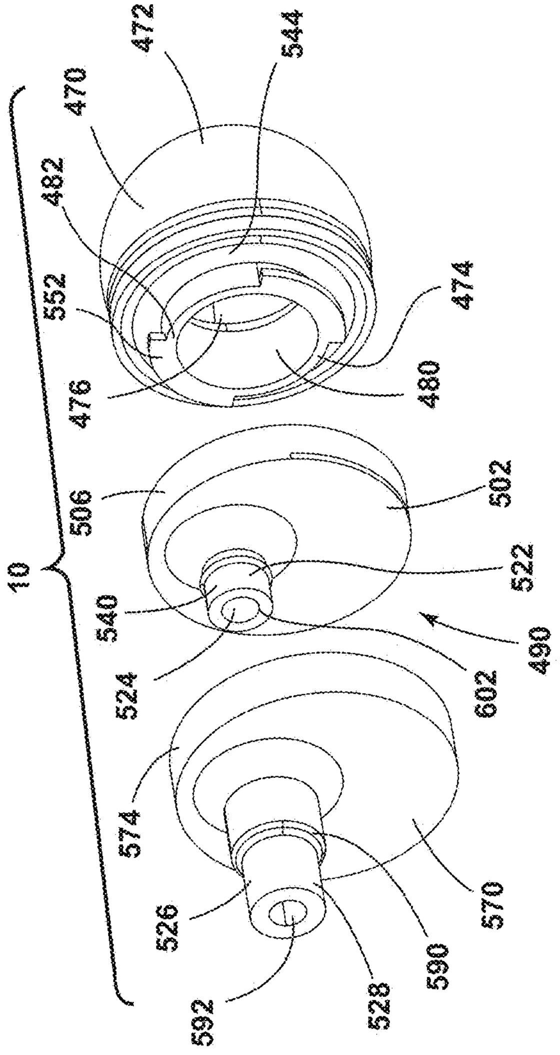
FIG. 26 is an exploded, side perspective view of the particulate reservoir of FIG. 25, according to an aspect of the present disclosure.
Figure 27:
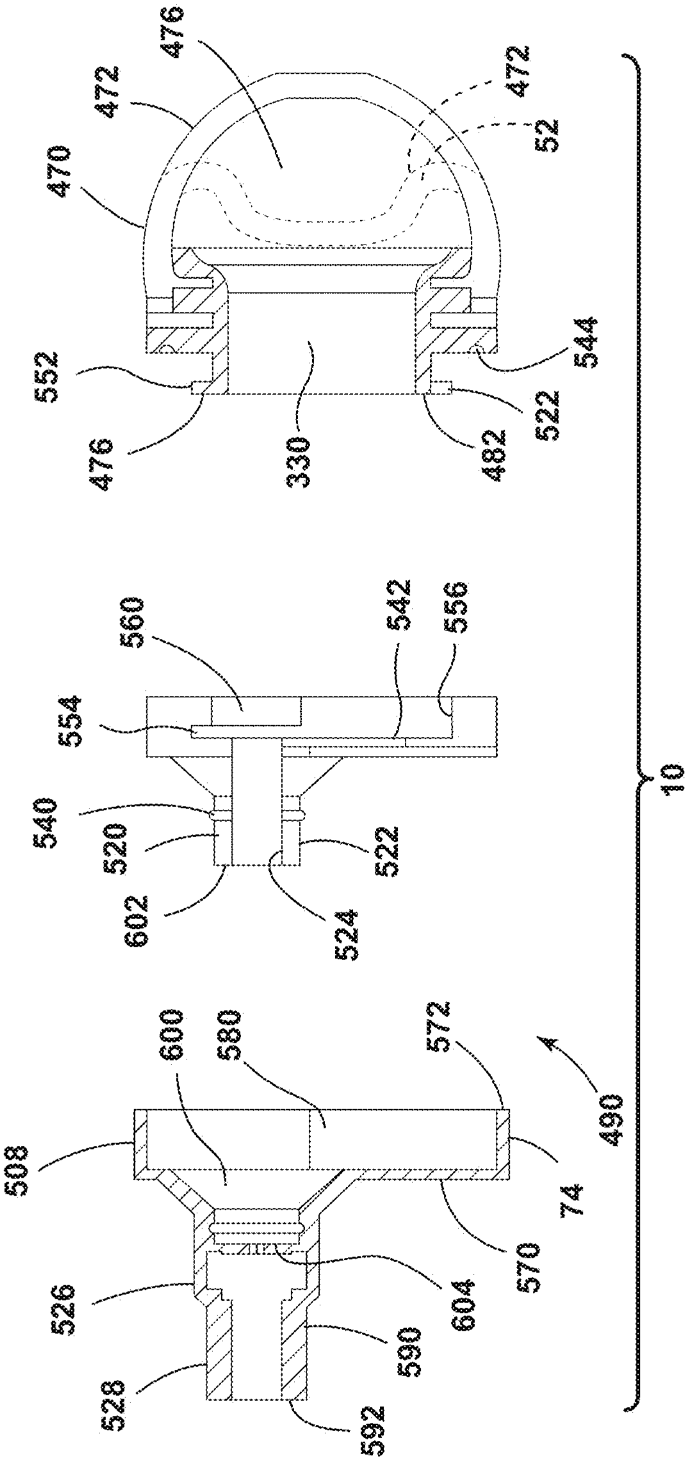
FIG. 27 is an exploded, cross-sectional view of the particulate reservoir of FIG. 25, according to an aspect of the present disclosure.

Referring to FIGS. 25-27, the neck 474 extends off of the pliable body 472. In some examples, the neck 474 can be integrally formed with the pliable body 472, or the neck 474 can be coupled to the pliable body 472. The neck 474 can have a shape and size less than the shape and size of the pliable body 472. For example, the neck 474 may define a cylindrical shape that has a lesser width than a width of the pliable body 472. The neck 474 defines a neck channel 480 that extends from the pliable capsule reservoir 476 within the pliable body 472 to a neck end 482. According to various aspects, the neck 474 is configured to couple to the cap 56 and permit fluid flow through the neck channel 480 in and into or out of the pliable capsule reservoir 476.

Referring to FIGS. 22-27, the cap 56 is couplable to the pliable capsule 470. In some aspects, the cap 56 may be a pliable capsule cap 490 that is coupled to the neck 474 of the pliable capsule 470. According to various aspects, the pliable capsule 470 is configured to operably permit the flow of fluid and particulates 32 into the pliable capsule, while also operably sealing the pliable capsule 470 such that fluid and/or particulates 32 disposed within the pliable capsule 470 are maintained within the pliable capsule 470.

Referring further to FIGS. 25-27, the pliable capsule cap 490 includes an inner portion 500 that couples to the neck 474. The inner portion 500 includes a front section 502, a rear section 504 opposing the front section 502, and an inner portion outer rim 506 extending around an outer periphery of the front section 502 and the rear section 504. The inner portion 500 can define one of various shapes, such as a rounded shape, an oval shape, a quadrilateral shape, or one of other various shapes. According to various aspects, the inner portion 500 has a shape and/or size that permits coupling of the inner portion 500 to the outer portion 508. For example, the inner portion 500 may have a coinciding shape and lesser width than an outer portion 508 of the pliable capsule cap 490 such that the inner portion 500 may be coupled to the outer portion 508 and at least partially encircled by the outer portion 508.

According to various aspects, the front section 502 can include an inner portion stem 520 that extends outward from the front portion 502. The inner portion stem 520 includes an inner portion stem body 522 and an inner portion stem channel 524 that extends through the inner portion stem body 522 and the inner portion front section 502 and rear section 504 such that the inner portion stem channel 524 is in fluid communication with the pliable capsule reservoir 476. According to various aspects, the inner portion stem 520 is configured to insert into an outer portion stem 526 of the outer portion 508 to define a pliable capsule cap nozzle 528, as provided herein. In such aspects, it is generally contemplated that the inner portion stem 520 may include an O-ring 540 that encircles the inner portion stem body 522. The O-ring 540 can abut an inner surface of the outer portion stem 526 and defined a sealed interface in aspects where the inner portion stem 520 is inserted into the outer portion stem 526.

Referring to FIGS. 25-27, the rear section 504 of the inner portion defines an inner portion recess 542. In some aspects, the inner portion recess 542 is defined on the rear section 504 of the inner portion and recesses towards the front section 502. The inner portion recess 542 has a shape, size, and/or depth that coincides with a shape, size, and/or length of the neck 474 such that the neck 474 can be inserted into the inner portion recess 542. For example, the inner portion recess 542 may have a depth that permits insertion of the neck 474 into the inner portion recess 542 such that the rear section 504 abuts a front surface 544 of the pliable body 472 that encircles the neck 474. The insertion of the neck 474 into the inner portion recess 542 operably couples the pliable capsule 470 to the inner portion 500.

According to various aspects, an interlock 550 is defined between the neck 474 and the inner portion 500 to at least partially assist in coupling the interlock 550 to the neck 474. The interlock 550 includes an interlock engagement members 552 extending outward from the neck 474 and an interlock engagement receiver 554 defined on the rear section of the inner portion 504. In some examples, the interlock engagement members 552 each at least partially encircle the neck 474 extend laterally outward from the neck 474. In various aspects, the interlock engagement receiver 554 is defined on an inner rim that encircles the inner portion recess 556, and the interlock engagement receiver 554 recesses outward from the inner rim 556. According to various aspects, the interlock engagement members 552 can be inserted into the interlock engagement receiver 554 to define the interlock 550 and couple the inner portion 500 to the neck 474.

Additionally, or alternatively, it is generally contemplated that the interlock may define a fixed coupling when the interlock engagement members 552 are rotated within the interlock engagement receiver 554. For example, the interlock 550 can include one or more interlock stops 560 that protrude inward from the inner rim 556 and at least partially extend towards the outer front section 570. In such examples, the interlock engagement members 552 are rotated within the interlock engagement receivers 554 until the interlock engagement members 552 are abutting the interlock stops 560. The abutment between the interlock engagement members 552 and the interlock stops 560 can then provide a fixed coupling between the neck 474 and the inner portion 500.

Referring to FIGS. 25-27, the pliable capsule cap 490 includes the outer portion 508 that couples to the inner portion 500. The outer portion includes a front segment 570 and a rear segment 572 opposing the front segment 570, and an outer portion outer rim 574 extending around an outer periphery of the front segment 570 and the rear segment 572. The outer portion 572 can define one of various shapes, such as a rounded shape, an oval shape, a quadrilateral shape, or one of other various shapes. According to various aspects, the outer portion 508 has a shape and/or size that permits coupling of the inner portion 500 to the outer portion 508. For example, the outer portion 508 can have a coinciding shape and greater width than the inner portion 500 such that the inner portion 500 may be coupled to the outer portion 508 and at least partially encircled by the outer portion 508.

Referring again to FIGS. 25-27, the rear segment of the outer portion 572 defines an outer portion recess 580. The outer portion recess 580 is defined in the rear segment of the outer portion 572 and recesses towards the front segment 570. The outer portion recess 580 has a shape, size, and/or depth that coincides with the shape, size and/or depth of the inner portion 500 such that the inner portion 500 can be inserted into the outer portion recess 580. For example, the outer portion recess 580 can define a rounded shape and have a depth that permits insertion of the inner portion 500 into the outer portion recess 580 such that an outer portion inner rim 506 abuts the outer portion outer rim 574 and the rear segment of the outer portion 572 is recessed, parallel, or protruding from the rear section 504 of the inner portion 500.

According to various aspects, the front segment 570 includes the outer portion stem 526 that extends outward from the front segment 570. The outer portion stem 526 includes an outer portion stem body 590 and an outer portion stem channel 592 that extends through the outer portion stem body 590, as well as the outer portion front segment 570 and rear segment 572, such that the outer portion stem channel 592 is in fluid communication with the pliable capsule reservoir 476.

Referring to FIG. 27, the outer portion stem 590 defines an inner portion stem receiving cavity 600 within the outer portion stem 590 that permits insertion of the inner portion stem 520 into the outer portion stem 526. The inner portion stem receiving cavity 600 can define a shape that coincides or differs from the shape and size of the inner portion stem 520. For example, the inner portion stem receiving cavity 600 can have a shape that permits insertion of the inner portion stem 520 into the outer portion stem 526 such that the end 602 of the inner portion stem 520 abuts an inner portion stem stop 604 that is disposed forward of the inner portion stem receiving cavity 600.

According to various aspects, the outer portion stem 526 and the inner portion stem 520 can together define the pliable capsule cap nozzle 528. The pliable capsule cap nozzle 528 is configured to couple to the separator nozzle 42 of the separator 34 such that particulates 32 can be disposed within the pliable capsule cap nozzle 528 as the separator 34 separates particulates from the fluid. The particulates 32 may then translate from the outer portion stem channel 592, the inner portion stem channel 524, and into the pliable capsule reservoir 476. Additionally, or alternatively, it is generally contemplated that the pliable capsule cap nozzle 528 can be configured to permit the flow of fluid from the pliable capsule reservoir 476 and into the separator 34. For example, the pliable body 472 can be compressed such that the fluid within the pliable capsule reservoir 476 flows out of the pliable body 472, through the pliable capsule cap nozzle 528, and into the separator 34. In such examples, a filter, mesh, and/or permeable membrane can be disposed within the fluid flow such that fluid can flow out of the pliable capsule reservoir 476, while the microplastics 32 are maintained within the pliable capsule reservoir 476. In some aspects, the filter, mesh, and/or permeable membrane can be a mesh plate that is plate of a valve. For example, a one-way valve with a mesh plate can be disposed within the fluid flow such that the fluid and microplastics 32 can flow into the pliable capsule reservoir 476 when the valve is opened. Once the valve is closed, the fluid is permitted to flow out of the pliable capsule reservoir 476 and the microplastics 32 are maintained within the pliable capsule reservoir 476. Additionally, or alternatively, it is generally contemplated that various kinds of valves can be disposed within the pliable capsule cap nozzle 528 such that fluid flow can be regulated. For example, a duckbill valve or a joker valve can be installed within the outer portion stem channel 592 such that the flow of fluid is regulated.

Referring to FIGS. 1-27, the particulate reservoir 10 provides for a variety of advantages. For example, the appliance 14, by having the particulate reservoir 10 positioned within the fluid flow system 30, is able to filter out, and dispose of, microplastics 32 and other particulates that can accumulate within the fluid. In particular, the particulate reservoir 10, by utilizing the capsule 54 and the plunger assembly 180, is able to receive the separate microplastics 32 from the separator 34, compress the microplastics 32, and provide a user the means to remove the microplastics 32 from the fluid flow system 30. Similarly, the particulate reservoir 10, by utilizing the filter assembly 315, is able to receive microplastics 32 within the filter body 324 and likewise remove the microplastics 32 from the fluid flow system 30. Further, the particulate reservoir 10, by utilizing the pliable capsule 470 and the pliable capsule cap 490, which receives microplastics 32 from the separator 34, is able to provide a user the means to remove the microplastics 32 from the fluid flow system 30. It is further generally contemplated that the appliance 14 with the particulate reservoir 10 provides additional benefits that can be used in a variety of appliances.

This device disclosed herein is further summarized in the following paragraphs and is further characterized by combinations of any and all of the various aspects described herein.

According to one aspect of the present disclosure, an appliance includes a cabinet, a tub disposed within the cabinet, and a fluid flow system disposed within the cabinet. The laundry appliance also includes a particulate reservoir disposed within the cabinet and operable between a static condition and a compressed condition. The particulate reservoir includes a capsule disposed within the cabinet and configured to receive particulate-laden fluid, a cap coupled to the capsule, and a nozzle extending outward from the capsule. The nozzle is configured to permit flow of the particulate-laden fluid into the capsule in the static condition, and where particulates of the particulate-laden fluid are captured within the capsule.

According to another aspect, the cap is decouplable from the capsule and the capsule is removable from the cabinet.

According to another aspect, the particulate reservoir includes a plunger assembly coupled to a cap and into the capsule. The plunger assembly includes a shaft that extends through the cap and into the capsule. The plunger assembly is operable within the capsule to define a static condition and a compressed condition. The plunger assembly is configured to define particulates within the capsule as a compressed puck of particulates within the capsule.

According to another aspect, the appliance includes a handle of a shaft, and where the shaft extends through a front wall of a cabinet to the handle positioned exterior of the cabinet.

According to another aspect, a capsule is a pliable capsule defining a rounded shape. The pliable capsule is compressed when a particulate reservoir is in a compressed condition.

According to another aspect, a pliable capsule extends outward from an outer surface of the cabinet.

According to another aspect, a cap is disposed in a cabinet and the cap is disposed inward of a pliable capsule.

According to another aspect of the present disclosure, an appliance includes a cabinet, a tub disposed within the cabinet, and a fluid flow system disposed within the cabinet. The fluid flow system includes a separator configured to separate microplastics from fluid within the fluid flow system and a particulate reservoir disposed within the cabinet. The particulate reservoir includes a reservoir housing and a capsule disposed within the reservoir housing. The capsule defines a receiving cavity that is configured to receive microplastics from the separator. A cap is operably disposed over a front portion of the capsule. A plunger assembly is coupled to the cap and extends into the receiving cavity. The plunger assembly is configured to define a static condition of the particulate reservoir that receives the microplastics from the separator and a compressed condition that is configured to compress the microplastics within a rear portion of the receiving cavity into a puck of compressed microplastics.

According to another aspect, a nozzle extends outward from a sidewall of a capsule. The nozzle is configured to permit flow of microplastics into the capsule in a static condition.

According to another aspect, a fluid outlet extends rearward from a rear portion of a capsule. The capsule is configured to permit the flow of fluid out of the fluid outlet when a particulate reservoir is in a compressed condition.

According to yet another aspect, a shaft extends through a cap and into a receiving cavity, and where operation of the shaft defines a static condition and a compressed condition. A capsule seal is coupled to a first end of the shaft and is disposed within the receiving cavity, and where the capsule seal is proximate an interior surface of the cap when a particulate reservoir is in the static condition, and where the capsule seal is proximate a rear portion of the capsule when the particulate reservoir is in the compressed condition.

According to another aspect, a shaft handle is coupled to a second end of the shaft. The shaft handle extends through a wall of a cabinet.

According to yet another aspect, a pliable capsule extends outward from an outer surface of a cabinet.

According to another aspect, a first bracket extends upward from an outer wall of the reservoir housing, and a second bracket extends outward from the outer wall and offset from the first bracket. The first bracket and the second bracket are coupled to an exterior wall of the tub.

According to another aspect, a cabinet defines a recessed region on a front panel of the cabinet. A handle of a plunger assembly extends outward from the recessed region when a particulate reservoir is in a static condition.

According to yet another aspect of the present disclosure, an appliance includes a cabinet, a tub disposed within the cabinet, and a fluid flow system disposed within the cabinet. The fluid flow system includes a separator configured to separate microplastics from fluid within the fluid flow system, and a particulate reservoir disposed within the cabinet and operable between a static condition and a compressed condition. The particulate reservoir includes a pliable capsule at least partially disposed within the cabinet. The pliable capsule defining a pliable body and a neck extending off of the pliable body. The pliable body defines a pliable capsule reservoir that is configured to receive microplastics from the separator, a cap operably coupled to the neck, and a nozzle extending outward from the capsule. The nozzle is configured to permit flow of the microplastics into the pliable capsule reservoir in the static condition. The nozzle is configured to permit flow of the fluid out of the pliable capsule reservoir and into the separator in the compressed condition.

According to another aspect, the pliable body is comprised of an elastomeric material. The pliable body compresses towards the cap in the compressed condition.

According to another aspect, the cap further includes an outer portion coupled to the separator, and an inner portion inserted into the outer portion. The inner portion is coupled to the neck.

According to another aspect, an interlock is defined between the inner portion and the neck. The interlock includes interlock engagement members that extend outward from the neck and an interlock engagement receiver defined on the inner portion. A rotation of the pliable capsule in a first direction fixedly couples the neck to the inner portion, and a rotation of the pliable capsule in a second direction that opposes the first direction decouples the neck from the inner portion.

According to another aspect, an outer portion includes an outer portion outer rim and an outer portion inner rim opposing the outer portion outer rim. An inner portion includes an inner portion outer rim that abuts the outer portion inner rim.

According to another aspect of the present disclosure, an appliance includes a cabinet, a tub disposed within the cabinet, and a fluid flow system disposed within the cabinet. The laundry appliance also includes a particulate reservoir disposed within the cabinet. The particulate reservoir includes a filter assembly disposed within the cabinet. The filter assembly includes a filter body that is configured to collect particulates within the fluid flow system. A wiper is disposed within the filter body and is configured to decouple the particulates from an inner sidewall of the filter body and direct the particulates to a second end of the filter body.

According to another aspect, a stem extends off of a first end of a filter body and is coupled to the wiper, and where a linear movement or rotational movement of the stem is configured to move the wiper and decouple particulates from an inner sidewall of the filter body.

According to another aspect, a handle is coupled to a second end of a filter body, and a linear movement of the handle away from the second end directs the wiper towards the second end.

According to another aspect, a wiper aperture is defined on a second end of a filter body, and a wiper is configured to direct particulates towards the wiper aperture.

According to another aspect, a wiper includes bristles extending outward from an outer rim of the wiper.

According to another aspect, a wiper is a wiper band that includes a first wiper band and a second wiper band, and where a rotational movement of a stem that is coupled to the wiper band rotates the first wiper band and the second wiper band, the rotation of the first wiper band and the second wiper band dislodging particulates from an inner sidewall of a filter body.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes, and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

What is claimed is:

1. An appliance, comprising:

a cabinet;

a tub disposed within the cabinet;

a fluid flow system disposed within the cabinet; and a particulate reservoir disposed within the cabinet and operable between a static condition and a compressed condition, wherein the particulate reservoir includes:

a capsule disposed within the cabinet and configured to receive a particulate-laden fluid;

a cap coupled to the capsule;

a nozzle extending outward from the capsule, wherein the nozzle is configured to permit flow of the particulate-laden fluid into the capsule in the static condition, wherein particulates of the particulate-laden fluid are captured within the capsule;

a plunger assembly coupled to the cap, the plunger assembly including a shaft that extends through the cap and into the capsule, the plunger assembly operable within the capsule to define the static condition and the compressed condition, the plunger assembly being configured to compress particulates within the capsule into a compressed puck of particulates within the capsule; and a handle of the shaft, wherein the shaft extends through a front wall of the cabinet to the handle positioned exterior of the cabinet.

2. The appliance of claim 1, wherein the cap is decouplable from the capsule, and wherein the capsule is removable from the cabinet.

3. The appliance of claim 1, wherein the capsule is a pliable capsule defining a rounded shape, the pliable capsule being compressed when the particulate reservoir is in the compressed condition.

4. The appliance of claim 3, wherein the pliable capsule is compressible towards the cap.

5. The appliance of claim 4, wherein the cap is coupled to the cabinet, and wherein the cap is disposed inward of the pliable capsule.

6. The appliance of claim 3, wherein the pliable capsule includes a pliable body that is composed of an elastomeric material.

7. The appliance of claim 6, wherein the pliable capsule includes a neck extending from the pliable body.

8. The appliance of claim 7, further comprising:

an interlock defined between an inner portion of the cap and the neck.

9. The appliance of claim 8, wherein the interlock includes interlock engagement members that extend outward from the neck and an interlock engagement receiver defined on the inner portion.

10. The appliance of claim 9, wherein a rotation of the pliable capsule in a first direction fixedly couples the neck to the inner portion, and wherein a rotation of the pliable capsule in a second direction that opposes the first direction decouples the neck from the inner portion.

11. The appliance of claim 1, wherein the cap includes an outer portion that encircles a center portion, the center portion defining a shaft aperture that permits extension of the shaft therethrough.

12. The appliance of claim 11, wherein the shaft aperture is concentric with the center portion of the cap.

13. The appliance of claim 11, wherein the outer portion includes an outer portion outer rim and an outer portion inner rim opposing the outer portion outer rim, and wherein an inner portion of the cap includes an inner portion outer rim that abuts the outer portion inner rim.

14. An appliance, comprising:

a cabinet;

a tub disposed within the cabinet;

a fluid flow system disposed within the cabinet, the fluid flow system including a separator configured to separate microplastics from fluid within the fluid flow system; and a particulate reservoir coupled to the cabinet and operable between a static condition and a compressed condition, wherein the particulate reservoir includes:

a pliable capsule coupled to the cabinet, the pliable capsule defining a pliable body and a neck extending off of the pliable body, wherein the pliable body defines a pliable capsule reservoir that is configured to receive microplastics from the separator;

a cap operably coupled to the neck, wherein the cap comprises an outer portion coupled to the separator and an inner portion inserted into the outer portion, wherein the inner portion is coupled to the neck; and a nozzle extending outward from the capsule, wherein the nozzle is configured to permit flow of the microplastics into the pliable capsule reservoir in the static condition, and wherein the nozzle is configured to permit flow of the fluid out of the pliable capsule reservoir and into the separator in the compressed condition.

15. The appliance of claim 14, wherein the pliable body is comprised of an elastomeric material, and wherein the pliable body compresses towards the cap in the compressed condition.

16. The appliance of claim 14, further comprising:

an interlock defined between the inner portion and the neck, the interlock includes interlock engagement members that extend outward from the neck and an interlock engagement receiver defined on the inner portion, wherein a rotation of the pliable capsule in a first direction fixedly couples the neck to the inner portion, and wherein a rotation of the pliable capsule in a second direction that opposes the first direction decouples the neck from the inner portion.

17. The appliance of claim 14, wherein the outer portion includes an outer portion outer rim and an outer portion inner rim opposing the outer portion outer rim, and wherein the inner portion includes an inner portion outer rim that abuts the outer portion inner rim.

18. The appliance of claim 17, wherein the nozzle is in an off-center position with respect to the capsule.

19. The appliance of claim 18, wherein the nozzle is defined by an outer portion stem and an inner portion stem.

20. The appliance of claim 19, wherein the inner portion stem is aligned with the outer portion stem.

* * * * *